(12) United States Patent
Brusnitsyn et al.

(10) Patent No.: US 8,130,845 B2
(45) Date of Patent: Mar. 6, 2012

(54) METHOD AND APPARATUS FOR ESTIMATING AND COMPENSATING FOR JITTER IN DIGITAL VIDEO

(75) Inventors: Mikhail Brusnitsyn, North York (CA); Ian Clarke, North York (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1525 days.

(21) Appl. No.: 11/556,092

(22) Filed: Nov. 2, 2006

(65) Prior Publication Data

US 2008/0107186 A1 May 8, 2008

(51) Int. Cl.
*H04N 7/26* (2006.01)
(52) U.S. Cl. .................... 375/240.28; 375/240.16
(58) Field of Classification Search ........... 375/240.28
See application file for complete search history.

(56) References Cited

U.S. PATENT DOCUMENTS

| | | | |
|---|---|---|---|
| 5,737,447 A | 4/1998 | Bourdon et al. | |
| 5,909,242 A | 6/1999 | Kobayashi et al. | |
| 5,926,212 A | 7/1999 | Kondo | |
| 6,205,176 B1 | 3/2001 | Sugiyama | |
| 6,226,413 B1 | 5/2001 | Jandel | |
| 6,351,545 B1 | 2/2002 | Edelson et al. | |
| 6,535,244 B1 * | 3/2003 | Lee et al. | 348/208.1 |
| 6,584,155 B2 * | 6/2003 | Takeda et al. | 375/240.16 |
| 6,591,015 B1 * | 7/2003 | Yasunari et al. | 382/236 |
| 6,707,853 B1 | 3/2004 | Cook et al. | |
| 6,734,902 B1 | 5/2004 | Kawahara | |
| 7,050,502 B2 * | 5/2006 | Yasunari et al. | 375/240.16 |
| 7,558,405 B2 * | 7/2009 | Tico et al. | 382/107 |
| 7,916,794 B2 * | 3/2011 | Li et al. | 375/240.26 |
| 2003/0030728 A1 | 2/2003 | Kudo | |
| 2003/0223644 A1 | 12/2003 | Park | |
| 2004/0027454 A1 * | 2/2004 | Vella et al. | 348/155 |
| 2004/0190619 A1 * | 9/2004 | Lee et al. | 375/240.16 |
| 2004/0264792 A1 | 12/2004 | Hwang et al. | |
| 2005/0100233 A1 | 5/2005 | Kajiki et al. | |
| 2007/0076982 A1 * | 4/2007 | Petrescu | 382/294 |

* cited by examiner

*Primary Examiner* — Christopher S Kelley
*Assistant Examiner* — Maria Vazquez Colon
(74) *Attorney, Agent, or Firm* — Mark P. Watson

(57) ABSTRACT

A method of estimating and compensating for jitter between two video frames in a digital video sequence comprises comparing a pixel subset in one video frame to candidate matching pixel subsets within a search area in the other video frame to obtain a preliminary matching pixel subset. Based on the location of the preliminary matching pixel subset, an adapted search area is formed and the comparing is continued within the adapted search area to obtain a final matching pixel subset. Motion is calculated between the video frames based on the final match thereby to estimate the jitter. The video frames are then transformed based on the estimated jitter.

26 Claims, 28 Drawing Sheets

METHOD AND APPARATUS FOR ESTIMATING AND COMPENSATING FOR JITTER IN DIGITAL VIDEO

FIELD OF THE INVENTION

The present invention relates generally to image processing and more particularly, to a method and an apparatus for estimating and compensating for jitter between video frames in a digital video sequence.

BACKGROUND OF THE INVENTION

Video capture devices such as digital video cameras have become very popular due in part to reduced production costs and hence, reduced costs to consumers as well as to increased quality. These factors have in turn resulted in video functionality being embedded into other electronic consumer devices such as cellular telephones and personal digital assistants (PDAs).

Jitter is the result of undesirable movement of a digital video capture device during capture of a digital video sequence, and is typically due to unsteady hand movement or the like. It is often difficult for the inexperienced videographer or a user to avoid jitter during video capture. As a result, to deal with jitter, digital video capture devices commonly employ video stabilization. The goal of video stabilization is to reduce or eliminate unwanted jitter by estimating motion between consecutive video frames, and providing compensation for the estimated motion prior to sequential display of the video frames.

Methods of estimating motion between consecutive video frames in digital image sequences, particularly for the purpose of sequence compression, are well documented. For example, U.S. Pat. No. 6,535,244 to Lee et al. discloses an apparatus for stabilizing images in an image sequence captured using, for example, a camcorder. An optimal bit-plane detector determines the optimum bit-plane suitable for motion detection in a frame under a specific illumination condition. When selecting the optimum bit-plane, a lower bit-plane is selected under a low illumination condition and an upper bit-plane is selected under a higher illumination condition. Binary pixels in a motion vector detection region of the selected bit-plane are compared with a plurality of detection windows in a previous frame. A motion vector calculator determines the position at which a correlation value is at its minimum, and each of a plurality of motion vectors is calculated for each of a respective plurality of motion vector detection regions. An average value of the motion vectors for the plurality of motion vector detection regions is determined as an overall motion vector.

U.S. Pat. No. 5,737,447 to Bourdon et al. discloses an image motion estimator which partitions an image into macroblocks of a determined size that correspond to a hierarchical level. Three image sequence memories contain respective ones of three consecutive images and luminance values of a group of pixels surrounding a displaced pixel in a subsequent image. On the basis of the luminance values and predetermined initial displacement vectors, displaced inter-frame differences and gradients are calculated with respect to the sequence of images. Subsequent motion vectors in hierarchical levels are used to update motion vectors of preceding hierarchical levels to progressively obtain a "best" displacement. The best displacement is then stored in association with a reference frame to reduce the bit rate of the image sequence for transmission.

U.S. Pat. No. 5,909,242 to Kobayashi et al. discloses a method and device for stabilizing images in digital video sequences due to unintentional motion during capture. A motion detecting circuit includes a representative point memory which stores position and luminance data of a number of representative points within each of four selected detection areas. Each of the detection areas is divided into a number of regions, each having a respective representative point. A subtracting circuit evaluates a luminance difference between the present field and a previous field by accumulating the luminance differences of regions. A minimum correlative value is calculated for each of the detection areas and position data of the pixel having the minimum correlative value is evaluated. A motion vector of the whole screen, i.e. the image field, is then calculated on the basis of the position data and the correlative value. For each of the detection areas, the average correlative value is divided by a minimum correlative value and the result is compared to a threshold value in order to determine whether a motion vector for each of the detection areas has been erroneously detected.

U.S. Pat. No. 5,926,212 to Kondo discloses a motion vector detecting circuit and a camera shake detecting circuit for an image signal processing apparatus. Image data of one picture plane is divided into a plurality of blocks. A motion vector is detected by a block matching method, during which a check block of a reference frame is compared with check blocks in a predetermined search area of a previous frame. Block motion is calculated by accumulating differences between pixels in the check block in the reference frame and corresponding pixels in check blocks in the previous frame. The position of a best-matching check block in the previous frame relative to that of the check block in the reference frame is used to determine the relative motion between the frames. Alternatively, camera shake is corrected using the whole picture plane or on the basis of a relative large block in the reference frame being compared to check blocks in a search area of the previous frame. The search area in the previous frame is ±4 pixels larger than the check block in the horizontal direction and ±3 pixels larger than the check block in the vertical direction. Frame absolute difference sums between the block in the reference frame and respective check blocks are calculated to determine the check block corresponding to the lowest sum of absolute differences. If it is determined that there is at least one unmoving check block, camera shake is deemed not to have occurred.

U.S. Pat. No. 6,205,176 to Sugiyama discloses a method for coding and decoding an image sequence that compensates for motion in the image sequence. During a motion vector coding step, the difference between horizontal components of the motion vectors at a previous block and the present block and the difference between vertical components of the motion vectors at the previous block and the present block are obtained. The difference values are coded with Huffman codes and supplied to a multiplexer. Prediction error in motion vectors for coding is reduced particularly for cases in which the image has very few high frequency components.

U.S. Pat. No. 6,226,413 to Jändel discloses a method for estimating motion in a digital video sequence by exploiting redundancies to produce a lower bit rate of sequence transmission. A bit plane coding technique based on incremental object based segmentation is used to estimate motion in different bit planes. Estimation of the image sequence is done in order of decreasing bit plane significance, and incremental motion estimation and segmentation is performed after transmission of each bit plane.

U.S. Pat. No. 6,351,545 to Edelson discloses a system for determining dense motion vector fields between successive frames in a video stream and for interpolating frames based on the determined motion vector fields, in order to eliminate jerky motion in low frame rate motion pictures. A vector value is generated for each pixel in an image element in a first frame to indicate where the corresponding image element has moved to in the subsequent frame. The magnitudes of the determined vector values are scaled to correspond to the location in time of a frame being interpolated.

U.S. Pat. No. 6,591,015 to Yasunari et al. discloses a video coding method which employs a block-matching technique for evaluating correlation between a target block and a candidate block in respective frames. A motion vector representing distance and direction from a candidate block is produced for each target block. An equalization procedure facilitates accurate detection of motion in the instance where fading effects between frames being compared would otherwise adversely affect motion detection.

U.S. Pat. No. 6,734,902 to Kawahara discloses a vibration correcting device for a video camera. Outputs of a motion vector detection circuit and an angular velocity detection sensor are coupled in order to correct for vibration due to unintentional hand movement. The motion vector detection circuit detects motion vectors based on image luminance and employs a block matching method. The block matching method comprises dividing an input image signal into a plurality of blocks, calculating for each block the differences between its pixels and those in blocks in a preceding field or frame, and searching for a block of the preceding field or frame where the sum of the absolute values of the difference is at a minimum. The relative displacement of the matching blocks determines the motion vector. The entire motion vector is determined from the motion vectors of respective blocks, for example by averaging the motion vectors of the respective blocks. The angular velocity detection sensor discriminates panning and tilting based on the motion vector data per unit time in order to account for desirable panning operations.

U.S. Pat. No. 6,707,853 to Cook discloses a circuit for compensating for video motion. Macroblocks of data are translated into one or more motion compensation commands having associated correction data related to the macroblocks. The circuit supports a plurality of motion compensation modes.

U.S. Patent Application Publication No. 2002/0223644 to Park discloses an apparatus and method for correcting motion in an image due to undesirable shaking or vibration during image capture. The method increases efficiency of compression by eliminating data due to undesirable vibration that would otherwise require encoding. A motion estimator/detector detects motion vectors in units of predetermined blocks, calculates an average motion vector of a predetermined motion estimation range using the detected motion vectors, and corrects the image area to be compressed using the average motion vector.

U.S. Patent Application Publication No. 2003/00030728 to Kudo discloses a method for correcting for undesirable motion in video data captured with a video camera. An image motion detection circuit detects the motion in the entire image area by extracting feature points of the image in plural positions within the image area and calculating motion vectors from the changes in the feature points between plural images at different times. A blur detecting unit contains an angular velocity sensor which detects the vibration of the video camera. The blur detecting unit supplies input to the image motion detection circuit in order to determine whether the motion was the result of undesirable video camera vibration.

U.S. Patent Application Publication No. 2004/0027454 to Vella et al. discloses a stabilization method for an image sequence. Block matching methods that evaluate matchable blocks in a search area of parts of the images being compared are employed. A global motion vector is evaluated using individual block motion vectors. A region in a first image is subdivided into a plurality of pixel blocks, and each pixel block is assigned a respective weighting coefficient calculated on the basis of a respective inhomogeneity measurement. The motion vector for the region is estimated on the basis of the weighting coefficient assigned to each pixel block of the region. The inhomogeneity measure is used to evaluate the reliability of the pixel blocks for global motion estimation based on their respective frequency contents. The pixel blocks that are not capable of providing reliable information about image motion are discarded before the calculation of the block motion vectors.

U.S. Patent Application Publication No. 2005/0100233 to Kajiki et al. discloses a method and system for compressing image motion information using high compression predictive coding. Pixels in a frame are compared with corresponding pixels in a spatial or temporally adjacent frame and differential information is generated. The differential information is used in order to encode efficiently image sequence data.

Although techniques of estimating and compensating for jitter are known as exemplified above, improvements to such techniques are desired. It is therefore an object of the present invention to provide a novel method and an apparatus for estimating and compensating for jitter between frames in a digital video sequence.

SUMMARY OF THE INVENTION

According to one aspect there is provided a method of estimating jitter between two video frames in a digital video sequence, comprising:

comparing a pixel subset of one video frame to candidate pixel subsets within a search area in the other video frame to determine a preliminary matching pixel subset from the candidate pixel subsets;

determining an actual matching pixel subset from the other video frame based on the location of the preliminary matching pixel subset relative to said search area; and calculating a global jitter vector based on the pixel subset and the actual matching pixel subset thereby to estimate the jitter.

In one embodiment, the determining is based on the location of the preliminary matching pixel subset relative to the boundary of the search area. The determining comprises determining if the preliminary matching pixel subset is adjacent a border of the search area. If not, the preliminary matching pixel subset is designated as the actual matching pixel subset. Otherwise the search area is shifted and the pixel subset is compared to candidate pixel subsets within the shifted search area to determine the actual matching pixel subset.

Prior to the pixel subset comparing, the video frames are converted to monochrome based on an adjustable luminance threshold. The reliability of the actual matching pixel subset is also checked before calculating the global jitter vector.

In addition to calculating the global jitter vector, rotational jitter between the video frames is also calculated. The rotational jitter is corrected for accumulated error. The global jitter vector is also corrected for intentional panning.

The video frames are transformed based on the estimated jitter and a viewport is aligned with the transformed video frames in accordance with the estimated jitter. The video frames are then displayed with non-corresponding areas of the video frames being cropped.

According to another aspect, there is provided an apparatus for estimating jitter between two video frames in a digital video sequence, comprising:

a frame comparator comparing a pixel subset of one video frame to candidate pixel subsets within a search area in the other video frame to determine a preliminary matching pixel subset from the candidate pixel subsets;

a match position estimator determining the location of the preliminary matching pixel subset relative to said search area;

the frame comparator determining an actual matching pixel subset from the other video frame based on the location determined by the match position estimator; and a jitter estimator calculating a global jitter vector based on the pixel subset and the actual matching pixel subset thereby to estimate the jitter.

According to yet another aspect, there is provided a computer readable medium embodying a computer program for estimating jitter between two video frames in a digital video sequence, the computer program comprising:

computer program code comparing a pixel subset of one video frame to candidate pixel subsets within a search area in the other video frame to determine a preliminary matching pixel subset from the candidate pixel subsets;

computer program code determining an actual matching pixel subset from the other video frame based on the location of the preliminary matching pixel subset relative to said search area; and computer program code calculating a global jitter vector based on the pixel subset and the actual matching pixel subset thereby to estimate the jitter.

The jitter estimation and compensation method and apparatus provide advantages in that the required volume of calculations as compared to the prior art is reduced. Furthermore, memory requirements are reduced, performance is maintained and sufficient accuracy is achieved by using monochrome video frames in combination with overall absolute pixel difference comparisons in order to determine pixel subset matching.

BRIEF DESCRIPTION OF THE DRAWINGS

Embodiments will now be described more fully with reference to the accompanying drawings, in which.

DETAILED DESCRIPTION OF THE EMBODIMENTS

In the following description, a method, apparatus and computer readable medium embodying a computer program for estimating and compensating for jitter between two video frames in a digital video sequence are disclosed. During jitter estimation, a pixel subset of one of the video frames is compared to candidate pixel subsets within a search area in the other of the video frames to determine a preliminary matching pixel subset from the candidate pixel subsets. An actual matching pixel subset from the other of the video frames is determined based on the location of the preliminary matching pixel subset relative to the search area. A global jitter vector based on the pixel subset and the actual matching pixel subset is calculated thereby to estimate the jitter. The video frames are then transformed based on the estimated jitter thereby to compensate for the jitter.

The method and apparatus may be embodied in a software application including computer executable instructions executed by a processing unit including but not limited to a personal computer, a digital video capture device such as for example a digital camera, camcorder or electronic device with video capabilities, or other computing system environment. The software application may run as a stand-alone digital video tool or may be incorporated into other available digital video applications to provide enhanced functionality to those digital image video applications. The software application may comprise program modules including routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion. Embodiments of jitter estimation and compensation will now be described with reference to FIGS. 1 to 20.

Figure 1:
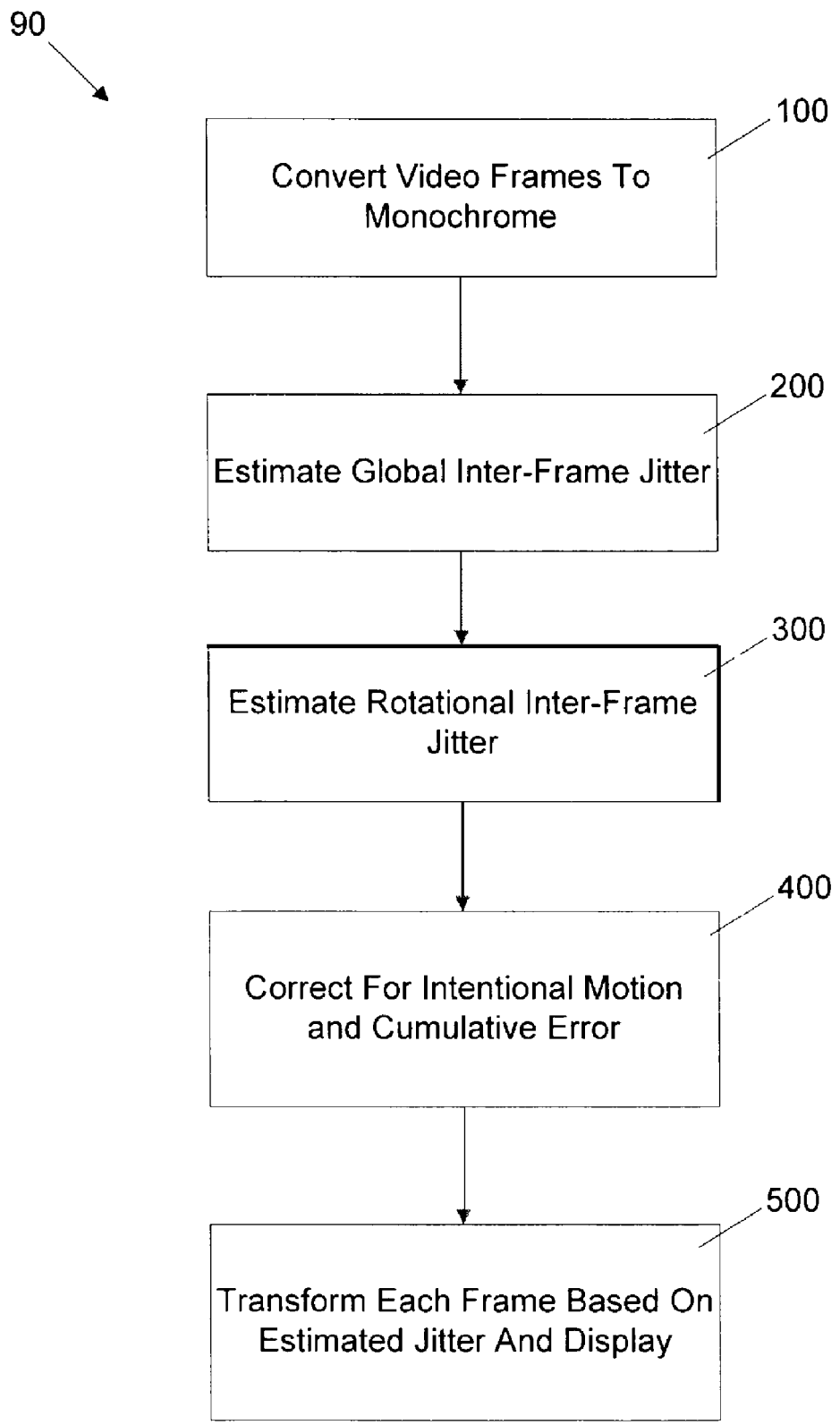
FIG. 1 is a flowchart showing the steps for estimating and compensating for jitter between video frames in a digital video sequence.

Turning now to FIG. 1, a flowchart showing the general steps performed in order to estimate and compensate for jitter between video frames in a digital video sequence is generally identified by reference numeral 90. During jitter estimation and compensation, for each pair of consecutive video frames, the video frames are firstly converted to monochrome (step 100) and global inter-frame jitter is estimated (step 200). Rotational inter-frame jitter is then estimated (step 300) and the global and rotational inter-frame jitter estimations are corrected for intentional motion and cumulative error (step 400). Based on the corrected global and rotational inter-frame jitter estimations, the video frames are transformed to compensate for the jitter, and displayed (step 500).

Figure 2:
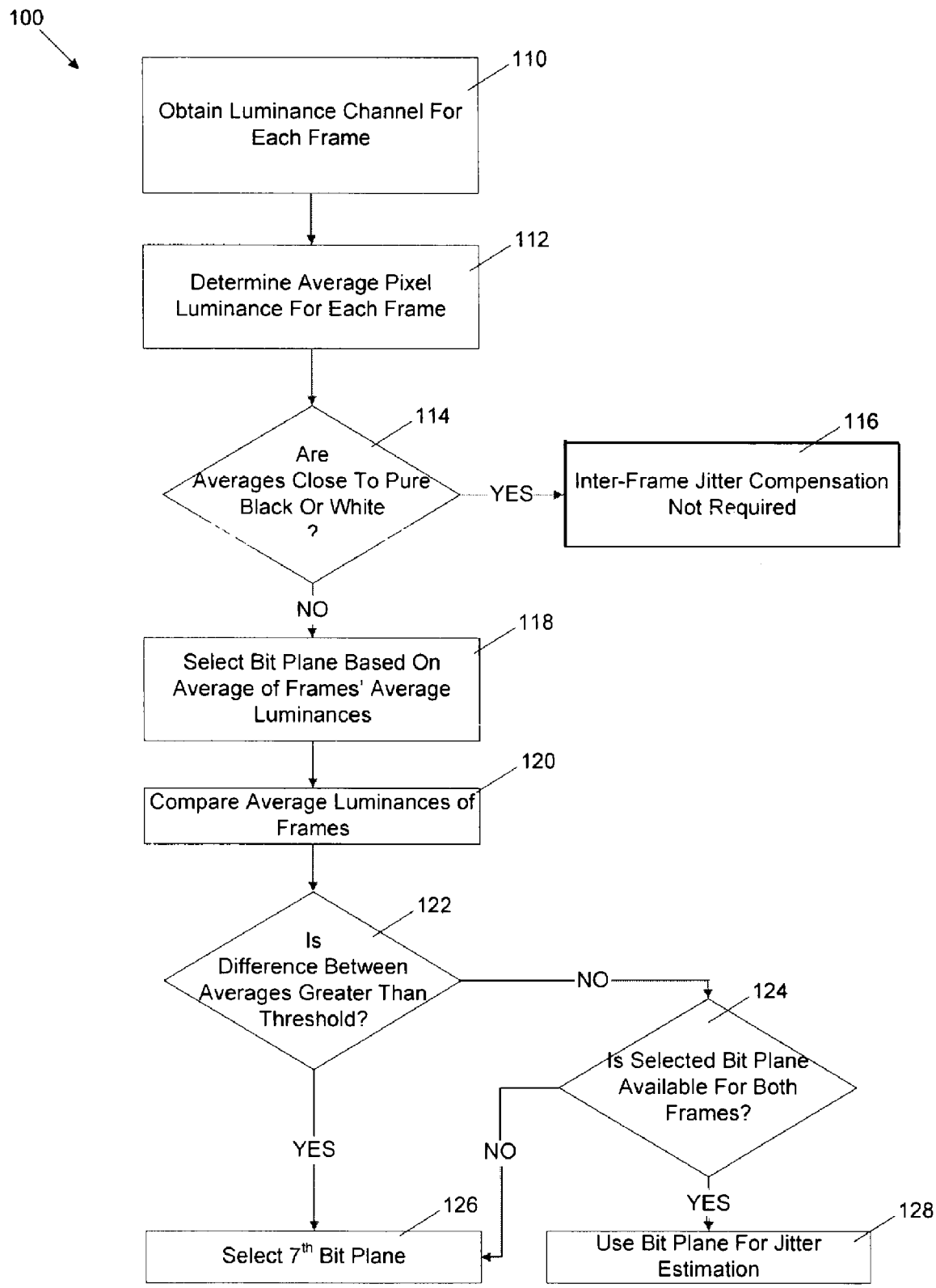
FIG. 2 is a flowchart showing the steps for converting the video frames to monochrome by selecting a bit plane.

FIG. 2 is a flowchart showing the steps performed during conversion of the video frames to monochrome at step 100. Initially, the luminance (Y) channel for the pixels in each of the video frames is obtained (step 110), and the average pixel luminance for each of the video frames is determined (step 112). The average luminance is between 0 and 255, and is represented by eight (8) bit planes numbered from zero (0) (least significant bit) to seven (7) (most significant bit).

The average pixel luminance for each video frame is then examined to determine if the average pixel luminance is close to black or close to white (i.e. less than seven (7) or greater than two hundred and forty-eight (248)) (step 114). If the average pixel luminance of each video frame is less than seven (7) or greater than two hundred and forty-eight (248) (i.e. its value corresponds to one of the $0^{th}$ to $3^{rd}$ or $8^{th}$ bit planes), inter-frame jitter compensation is deemed to be unnecessary as the jitter between the video frames will be relatively unnoticeable (step 116). Otherwise, one of the $4^{th}$, $5^{th}$ or $6^{th}$ bit planes is selected for each video frame (step 118) according to Table 1 below based on the average pixel luminance of the video frame:

TABLE 1

| Average Pixel Luminance | Bit Plane |
| --- | --- |
| 30-225 | $6^{th}$ |
| 15-29 or 226-240 | $5^{th}$ |
| 7-14 or 241-248 | $4^{th}$ |

The average pixel luminances of the video frames are then compared (step 120) to determine if the average pixel luminances differ by more than a difference threshold (step 122). This condition may arise as a result of a flash or automatic brightness adjustment occurring during video capture. If the difference between the average pixel luminances is greater than or equal to the difference threshold, the seventh ($7^{th}$) bit plane is selected (step 126). At step 122, if the difference between the average pixel luminances is less than the difference threshold, a check is made to determine whether the selected bit plane is available for both video frames (step 124). If the selected bit plane is available for both video frames, then the selected bit plane is retained (step 128). Otherwise, the seventh ($7^{th}$) bit plane is selected (step 126). Following either step 126 or step 128, once the bit plane has been selected, the pixels of each of the video frames are converted to monochrome (i.e. to black or white) based on the bit value of the pixels on the selected bit plane. In, particular, if the value of a pixel on the selected bit plane is zero (0), the pixel is designated as pure black. If however the bit value of the pixel is one (1), the pixel is designated as pure white. As will be appreciated, the value of the difference threshold is chosen based on the requirements of the implementation.

Selecting the bit plane in the manner described above yields a bit plane with reduced noise and useful video frame information. Employing a single bit plane for video frame comparisons rather than employing 8-bits-per-pixel significantly reduces the cost and complexity of video frame comparisons. For example, pixel-wise video frame comparisons can be performed using a fast exclusive-OR operation.

Figure 3:
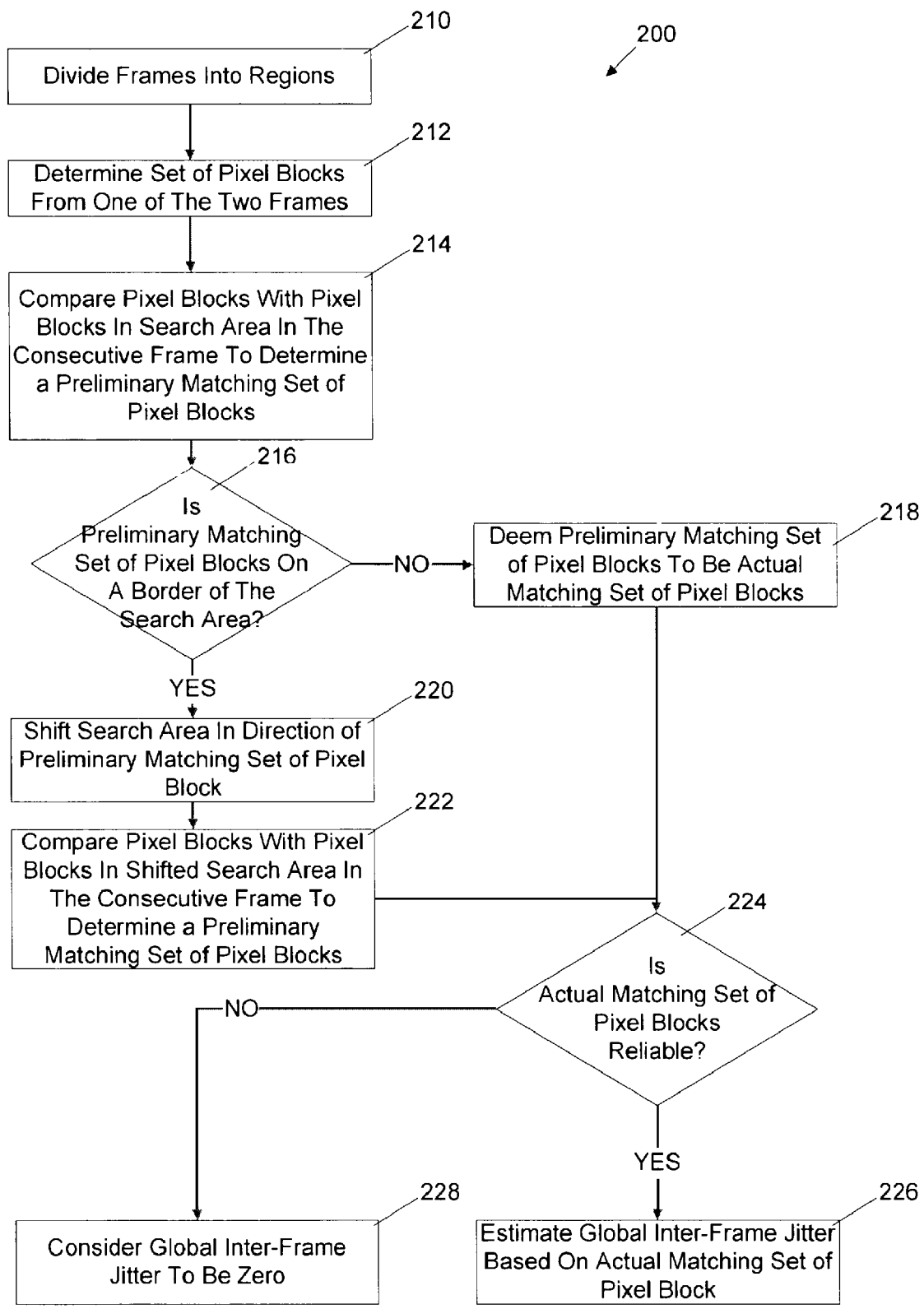
FIG. 3 is a flowchart showing the steps for performing frame matching using the monochrome video frames and an adaptable search area to estimate global inter-frame jitter.

FIG. 3 is a flowchart showing the steps performed during frame matching using the monochrome video frames and an adaptable search area to estimate global inter-frame jitter at step 200. Initially, regions of pixels in the first video frame are determined by dividing the first video frame either into nine (9) 3×3 rectangular regions, sixteen (16) 4×4 rectangular regions, or twenty-five (25) 5×5 rectangular regions (step 210) depending upon the size of the video frames. In this embodiment, the first video frame is divided into nine (9) 3×3 rectangular pixel regions.

After the pixel regions have been determined, a pixel subset comprising a set of pixel blocks that are generally evenly distributed across the first video frame is selected (step 212). Each pixel block in the set comprises n×n (i.e. 8×8 or 16×16) pixels so that a plurality of pixel blocks is located in each pixel region.

Figure 4:
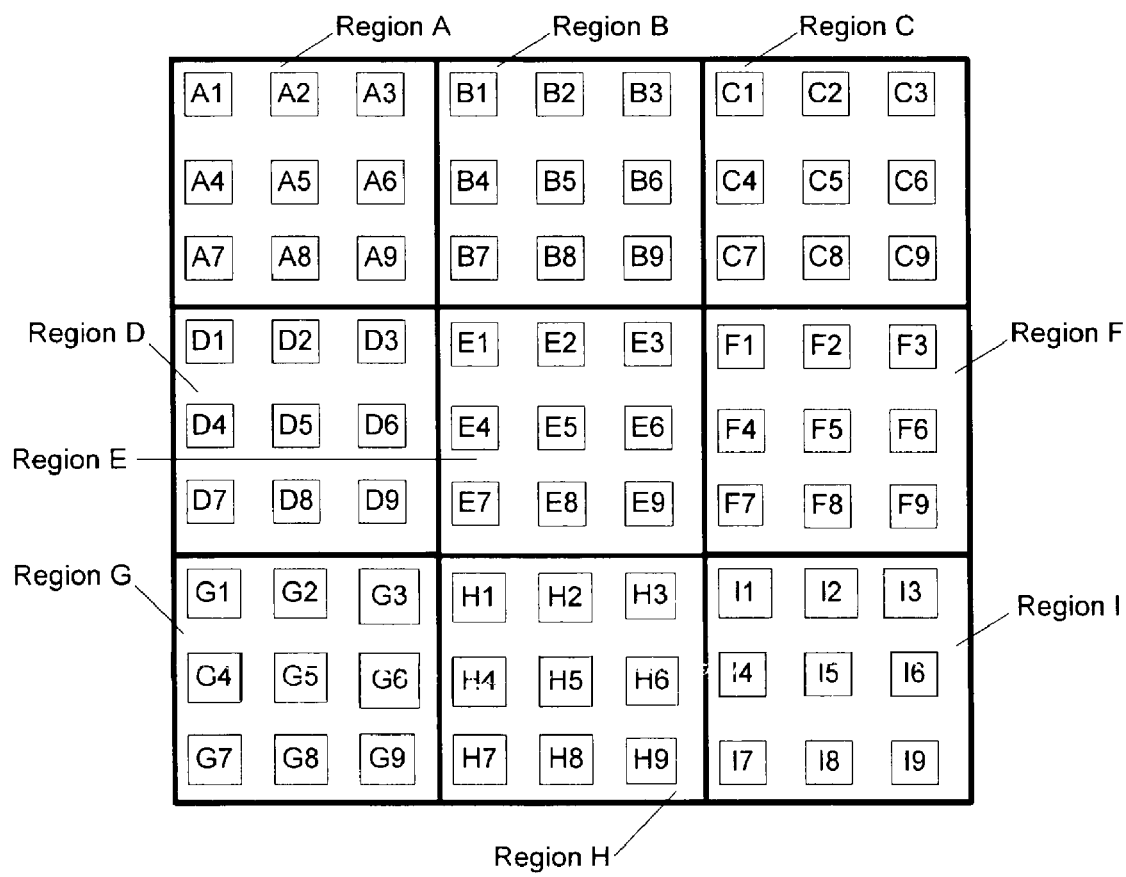
FIG. 4 is a diagram of a first video frame divided into regions, each region having a plurality of pixel blocks.

FIG. 4 shows the first video frame divided into nine (9) 3×3 pixel regions, each region having nine (9) spaced, discrete pixel blocks therein. The pixel regions are labeled as A to I, with the corresponding pixel blocks labeled as A1 to A9; B1 to B9; C1 to C9 etc.

A search area for each of the pixel blocks in the first video frame is then defined in the consecutive video frame. Each search area includes the pixels corresponding to those in its associated pixel block as well as a surrounding band of N pixels, where N is a small number. In this embodiment, N is equal to eight (8) such that the band is eight (8) pixels thick. In particular, each search area is both sixteen (16) pixels wider and sixteen (16) pixels taller (corresponding to a range of −8 to +8 in both the horizontal and vertical directions) than its associated pixel block.

Figure 5:
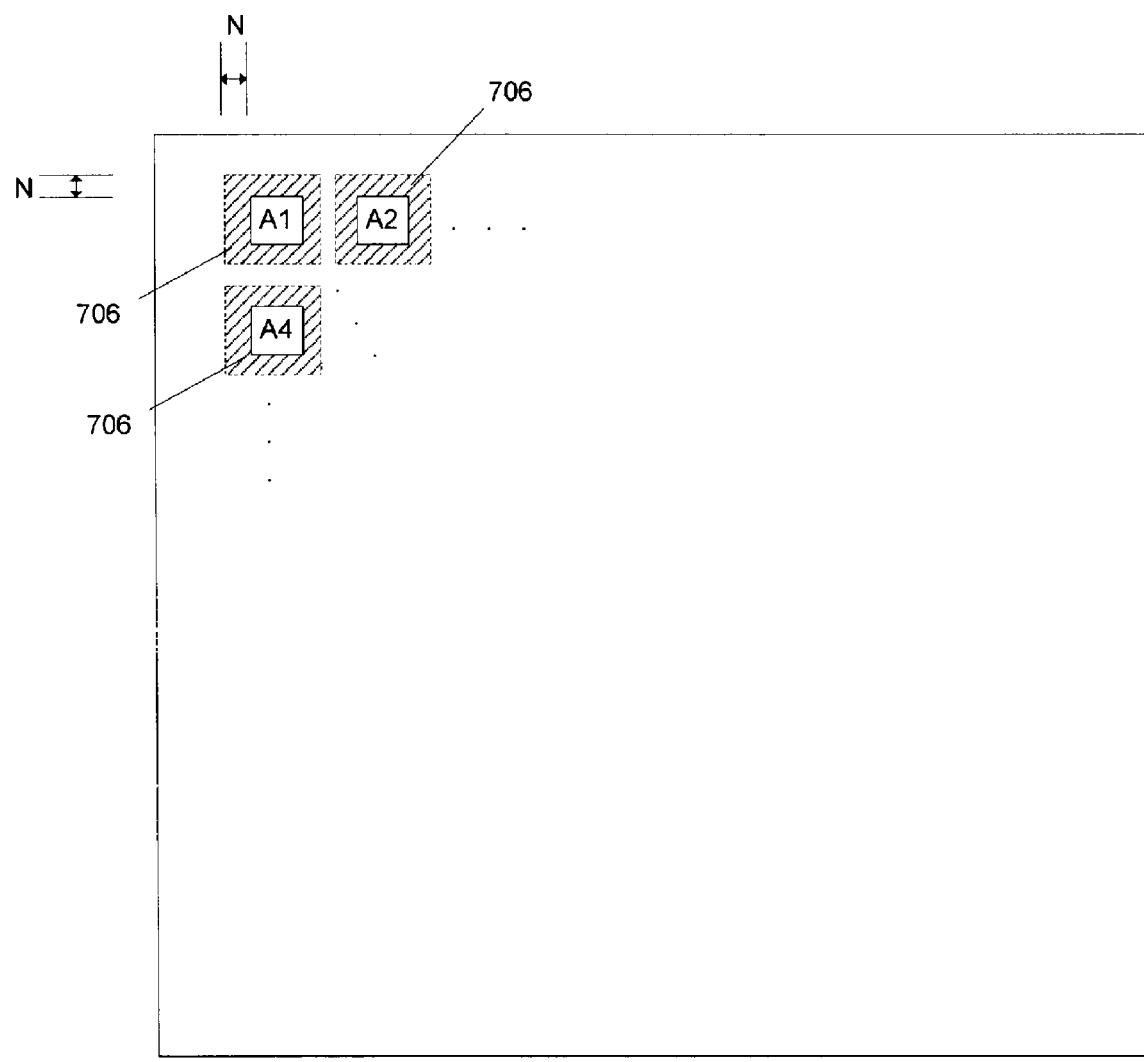
FIG. 5 is a diagram of a consecutive video frame showing three of the pixel blocks of FIG. 4 overlying respective search areas.

FIG. 5 shows the consecutive video frame with pixel blocks A1, A2 and A4 from the first video frame overlaying their respective search areas 706. Although not shown, the search areas 706 for pixel blocks A3 and A5 to 19 are defined in a similar manner. In aggregate, individual search areas 706 form an overall search area for the purpose of frame and region matching as will be described below.

A 17×17 global accumulator array is then defined. Also, for each of the pixel regions in the first video frame, a regional accumulator array is defined. In this embodiment, nine (9) 17×17 regional accumulator arrays are defined corresponding to the nine (9) pixel regions A to I. The dimensions of the global and regional accumulator arrays correspond to the number of different positions available for each pixel block within its associated search area 706 during panning of the pixel block over the entire search area.

Figure 6A:
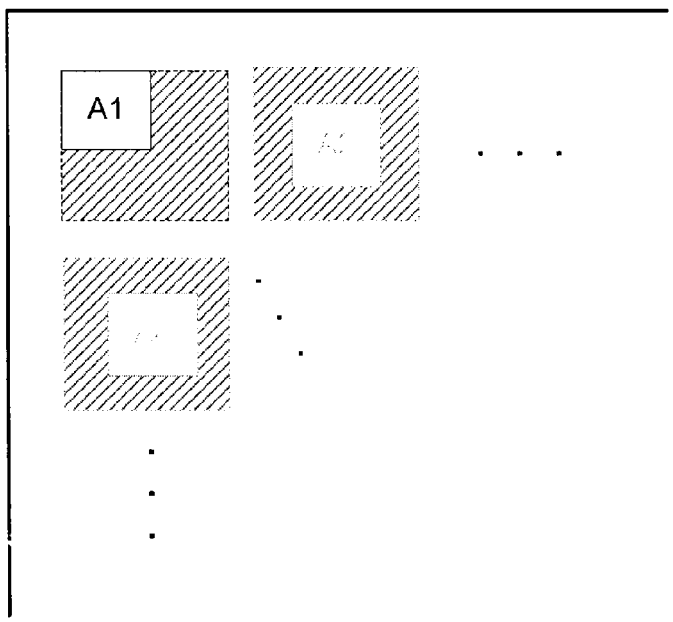
FIGS. 6A-6F are diagrams of a portion of the consecutive video frame of FIG. 5 with a first pixel block from the first video frame being progressively positioned within its respective search area during frame matching.

The pixel blocks in the first video frame are then compared with corresponding pixel blocks within their associated search areas 706 in the consecutive video frame in order to determine a preliminary matching set of pixel blocks (step 214). During this process, pixel block A1 defined for the first video frame is placed at the top left corner of its associated search area 706 in the consecutive video frame (corresponding to the (−8, −8) position in its associated search area 706), as shown in FIG. 6A. The pixels of pixel block A1 are then compared with the corresponding pixels in the associated search area 706 and absolute pixel differences are calculated. The calculated absolute pixel differences for pixel block A1 are then accumulated and stored at position (1, 1) in the regional accumulator array defined for pixel region A.

Figure 6B:
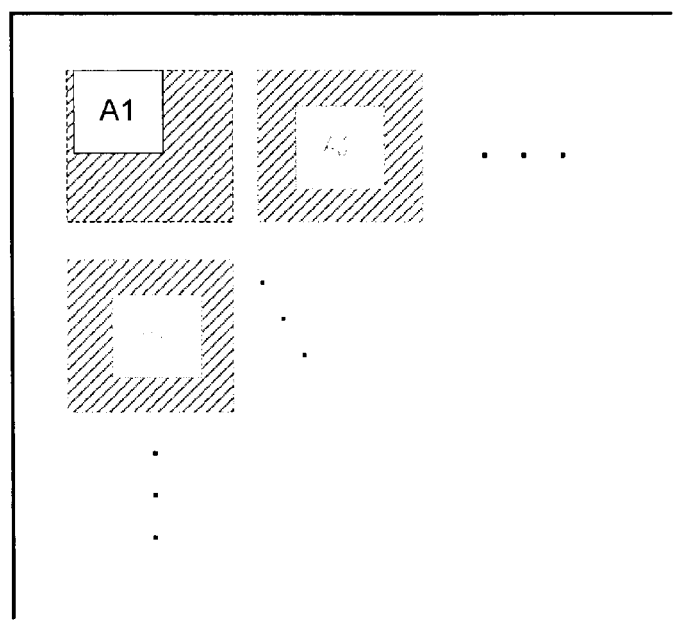
Figure 6C:
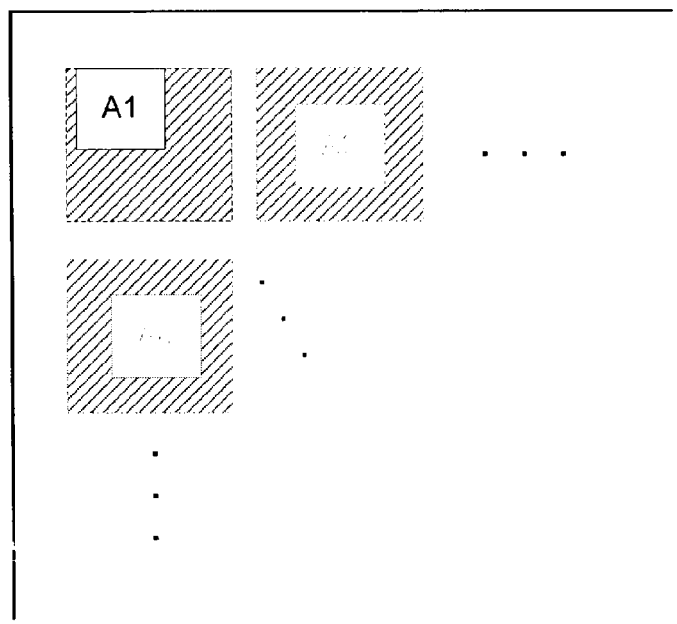
Figure 6D:
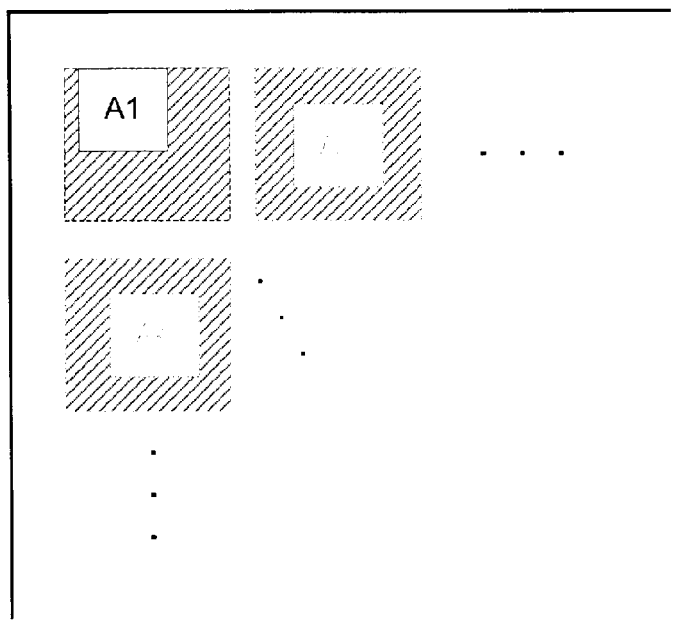
Figure 6E:
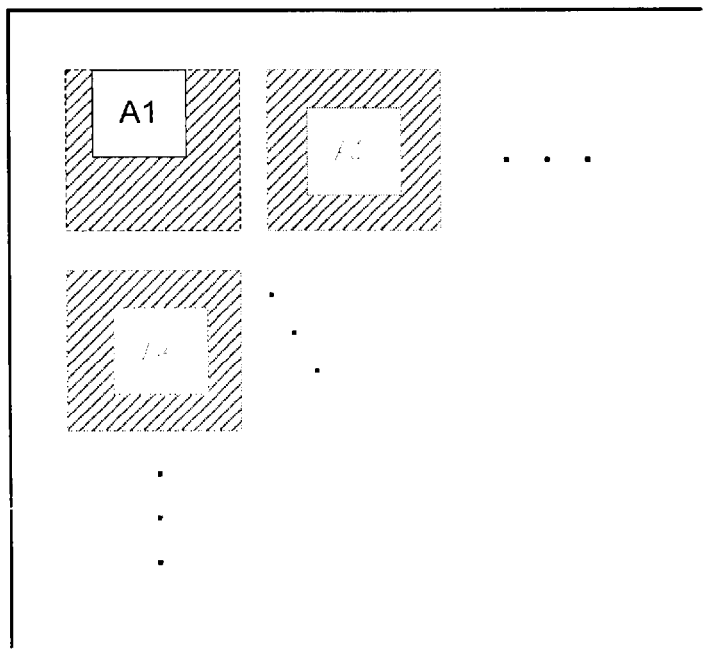
Figure 6F:
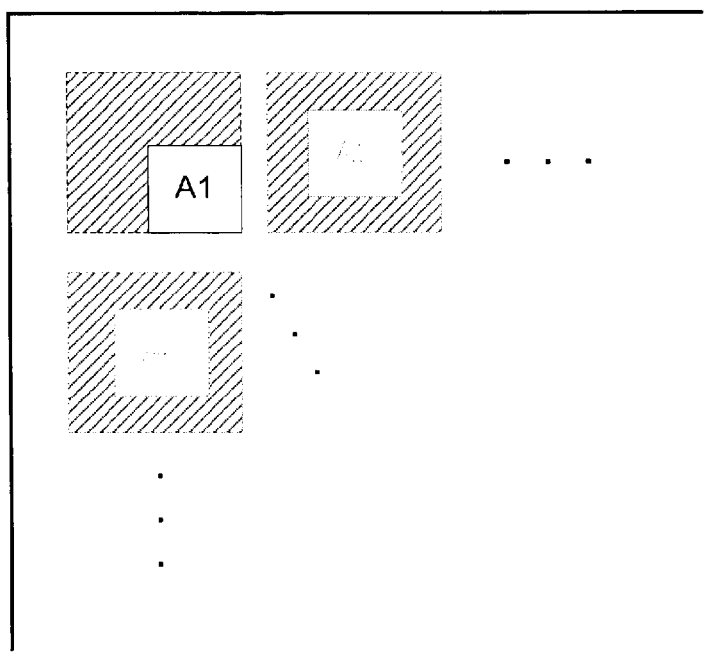

With the absolute pixel differences for pixel block A1 at the (−8, −8) location accumulated and stored, pixel block A1 is shifted by one pixel within the search area 706 as shown in FIG. 6B (corresponding to the (−8, −7) pixel block position in its associated search area 706) and the above steps are performed again. The calculated absolute pixel differences for pixel block A1 at position (−8, −7) are accumulated and stored at position (1, 2) in the regional accumulator array defined for pixel region A. Shifting of the pixel block within the search area 706 is performed again as shown progressively in FIGS. 6C, 6D and 6E and so forth until all combinations of pixels within the search area 706 have been processed as described above. Pixel block A1 having been shifted all the way to its final position (+8, +8) within the search area 706 is shown in FIG. 6F. As will be appreciated, at this pixel block position, the calculated absolute pixel differences are accumulated and stored at position (17, 17) in the regional accumulator array defined for region A. In this embodiment, because there are seventeen (17) searchable positions both horizontally and vertically, there are 17×17=289 pixel block positions to process.

Figure 7A:
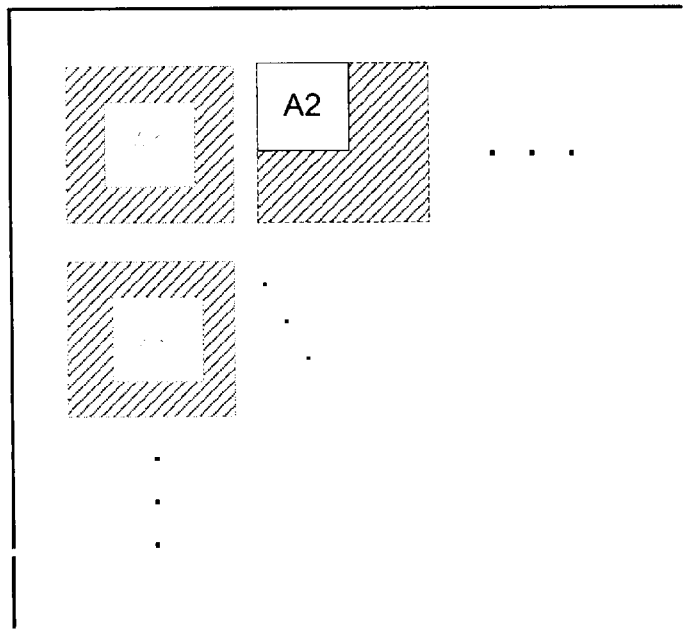
FIGS. 7A-7F are diagrams of a portion of the consecutive video frame of FIG. 5 with a second pixel block from the first video frame being progressively positioned within its respective search area during frame matching.

Once the pixel comparisons for pixel block A1 have been completed, a similar process for pixel block A2 is performed. During this process, pixel block A2 is initially placed at the top left corner of its associated search area 706 (corresponding to the (−8, −8) position in its associated search area 706), as shown in FIG. 7A. The pixels of pixel block A2 are then compared with the corresponding pixels in the search area 706 and absolute pixel differences are calculated. The calculated absolute pixel differences for pixel block A2 are then accumulated and added to the absolute pixel difference value stored at position (1, 1) in the regional accumulator array defined for region A.

Figure 7B:
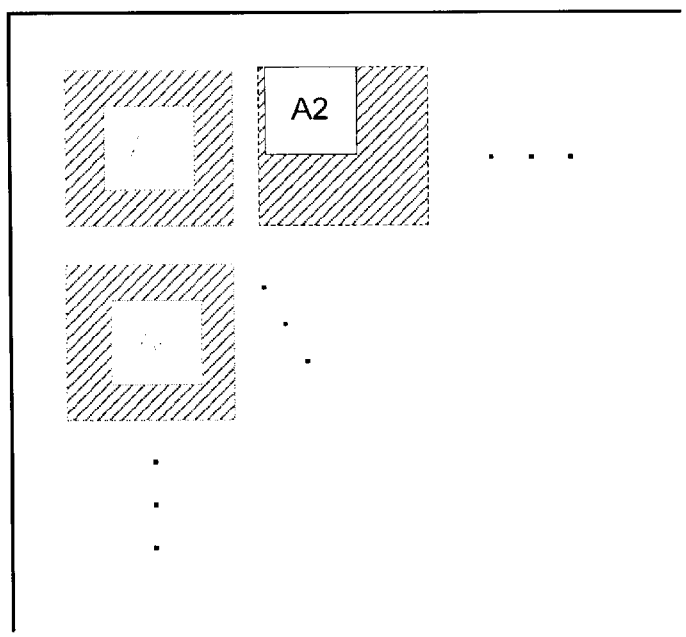
Figure 7C:
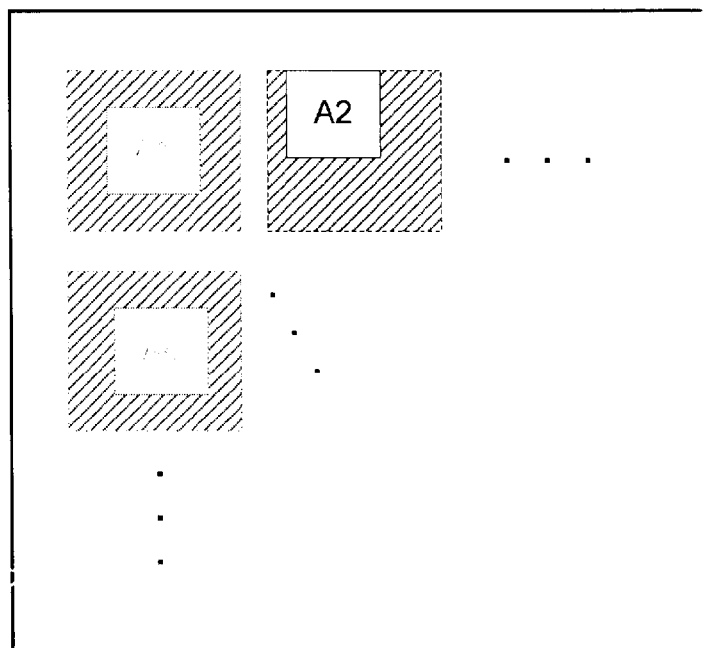
Figure 7D:
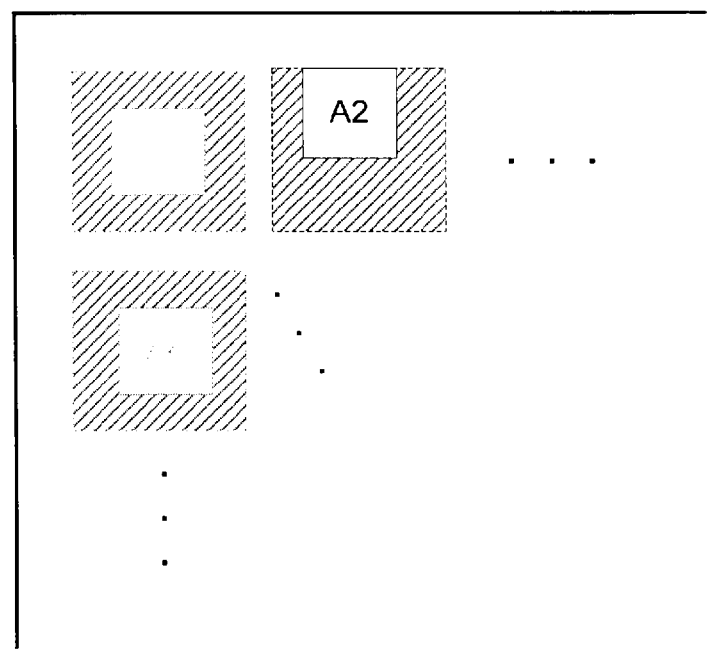
Figure 7E:
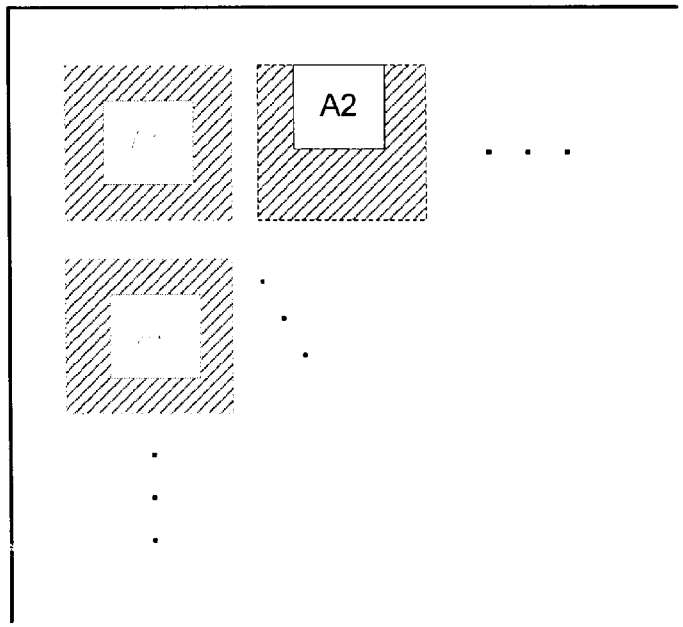
Figure 7F:
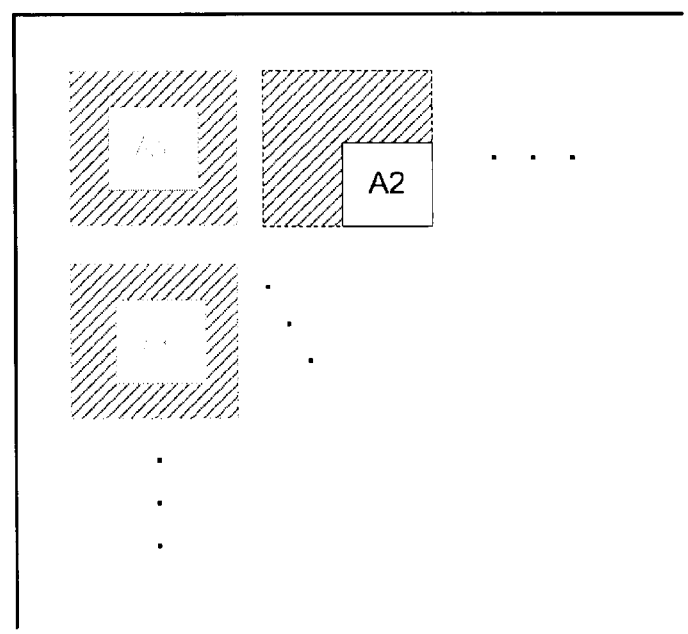
Figure 8A:
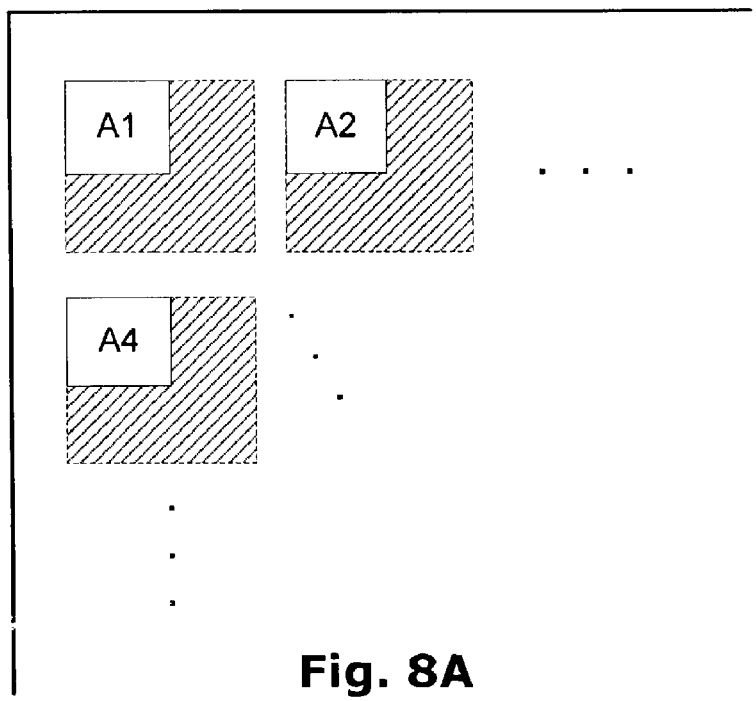
FIGS. 8A-8H are diagrams of a portion of the consecutive video frame of FIG. 5 illustrating positions of the pixel blocks from the first video frame in their respective search areas where the pixel blocks have at least one side coincident with a border of their respective search areas.
Figure 8B:
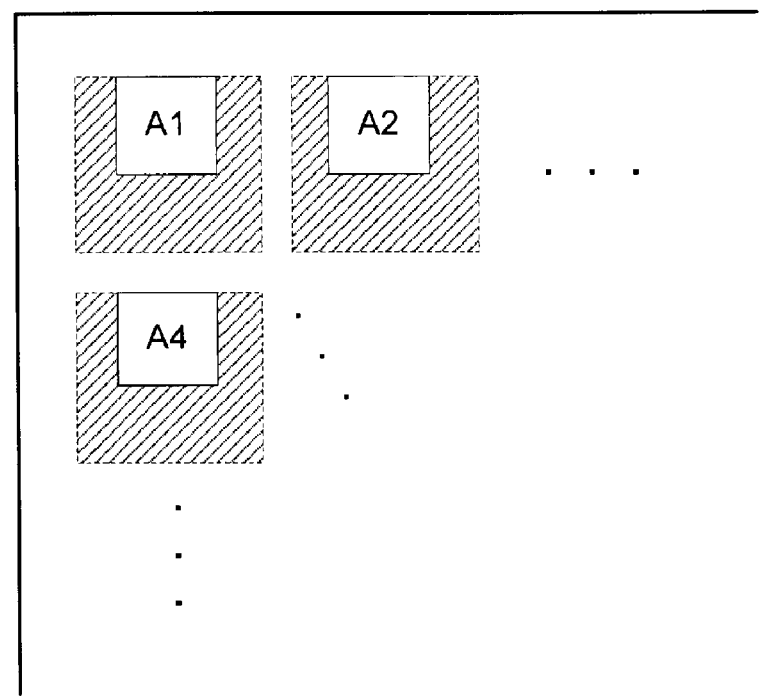
Figure 8C:
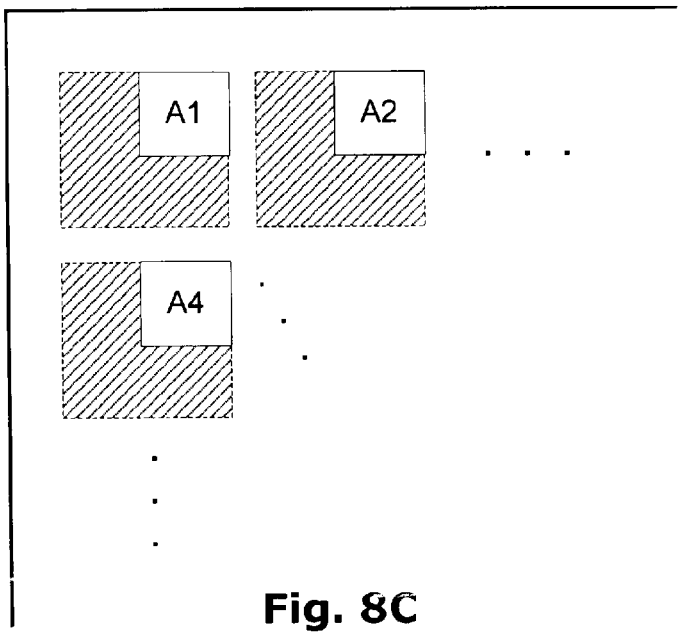
Figure 8D:
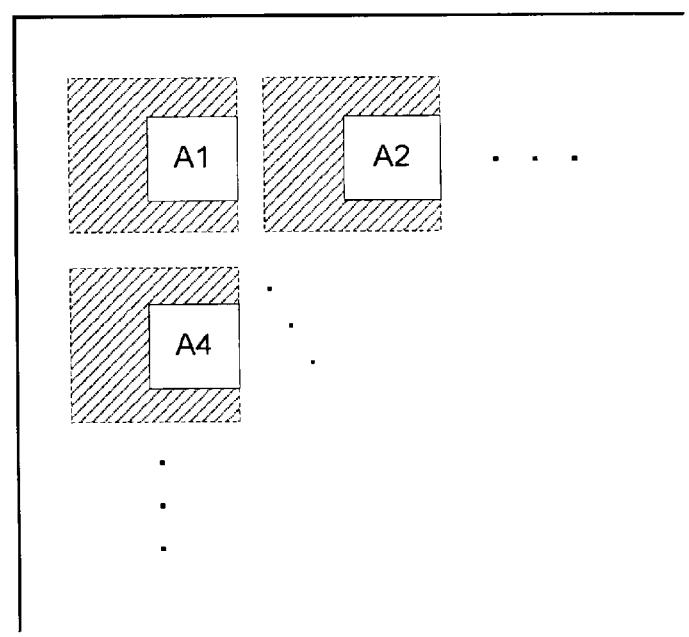
Figure 8E:
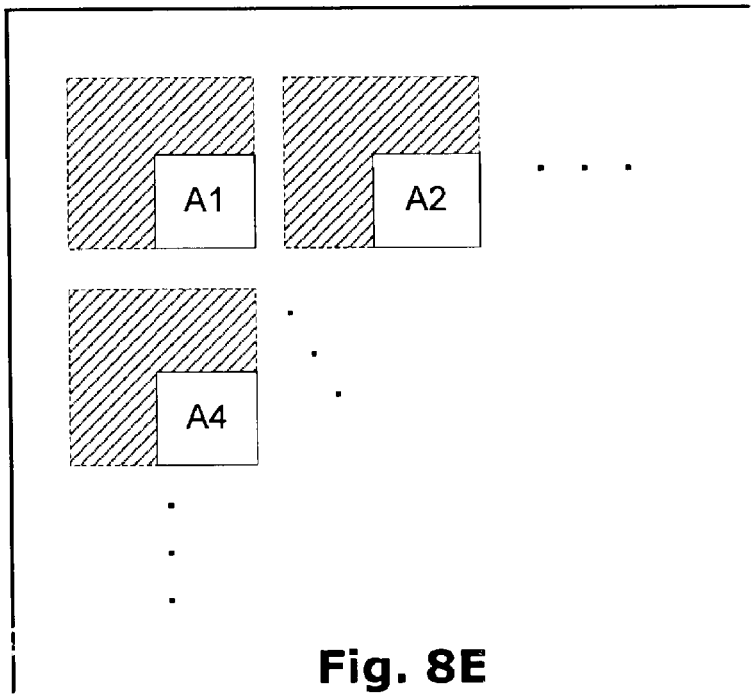
Figure 8F:
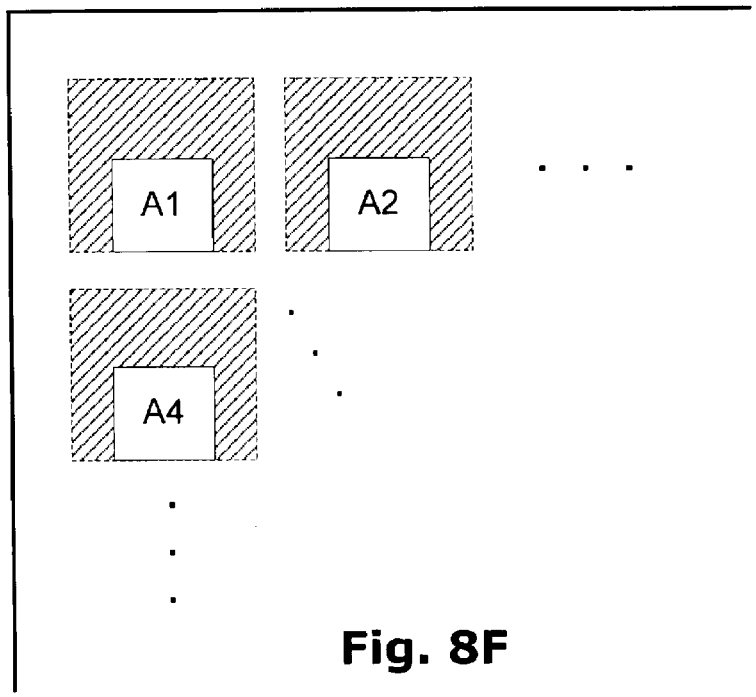
Figure 8G:
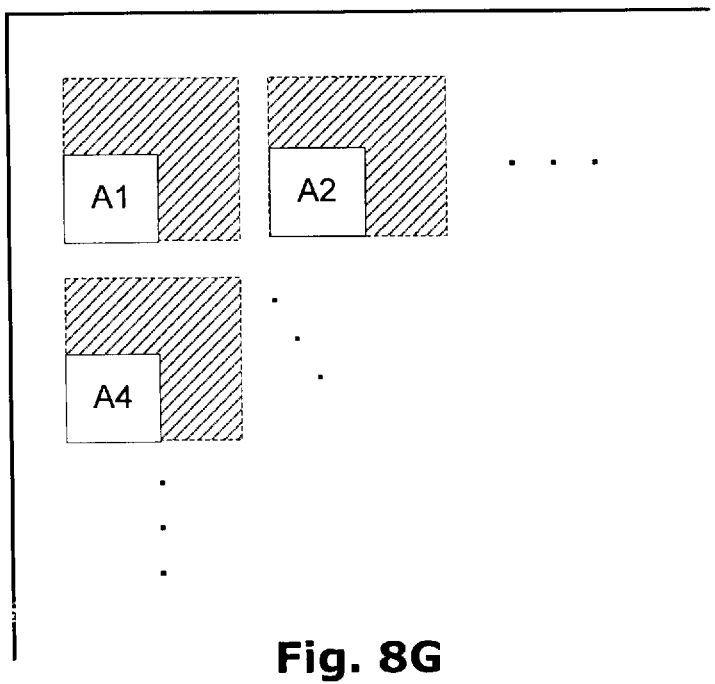
Figure 8H:
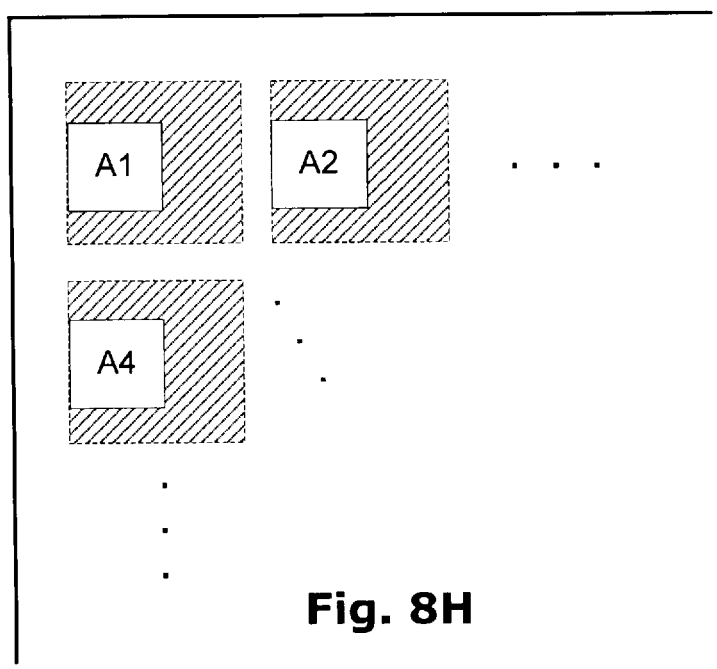

With the absolute pixel differences for pixel block A2 at the (−8, −8) location calculated and added to the regional accumulator array, pixel block A2 is shifted by one pixel within its associated search area 706 as shown in FIG. 7B (corresponding to the (−8, −7) pixel block position in the search area 706) and the above steps are performed again. The calculated absolute pixel differences for pixel block A2 at position (−8, −7) are accumulated and then added to the absolute pixel difference value stored at position (1, 2) in the regional accumulator array defined for region A. Shifting of pixel block A2 within the search area 706 is performed again as shown progressively in FIGS. 7C, 7D and 7E and so forth until all combinations of pixels within search area 706 have been processed as described above. Pixel block A2 having been shifted all the way to its final position (+8, +8) within the search area 706 is shown in FIG. 7F. At this pixel block position, the calculated absolute pixel differences are accumulated and added to the absolute pixel difference values stored at position (17, 17) in the regional accumulator array defined for pixel region A.

Once the pixel comparisons for pixel block A2 have been completed, a similar process for pixel block A3 is performed. The above process continues until pixel comparisons for the remaining pixel blocks A4 to A9 within pixel region A have been completed.

Once the processing for all of the pixel blocks within pixel region A has been completed, processing for the pixel blocks in pixel region B is conducted in a similar manner. During processing of the pixel blocks of pixel region B, calculated absolute pixel differences are accumulated and stored in the regional accumulator array defined for region B. With the pixel blocks of pixel region B processed, a similar process is carried out for the pixel blocks in each of the remaining pixel regions C to I. As a result of the above procedure, the regional accumulator array defined for each pixel region A to I is populated.

Following the above, the global accumulator array defined previously is populated using the accumulated absolute pixel difference values in the regional accumulator arrays. In particular, the nine (9) regional accumulator arrays are summed and the resultant accumulated global absolute pixel difference values are used to populate the global accumulator array. Thus, for example, the values at position (1, 1) of the regional accumulator arrays defined for pixel regions A to I are added and the sum is used to populate position (1, 1) in the global accumulator array. Once the global accumulator array has been populated, the position in the global accumulator array having the lowest global absolute pixel difference is determined.

While matching every pixel during frame matching would provide the most accurate result, practical considerations such as performance and cost place limitations on the possible number of pixel comparisons that can be made during frame matching. As will be appreciated, the size of the search areas has an impact on the speed and quality of the frame matching. For example, with a surrounding N pixel band, $(2N+1)^2$ absolute pixel differences must be calculated in order to find the best match. Should the surrounding pixel band be doubled to 2N, the total number of absolute pixel differences that must be calculated quadruples in number. Speed of computation is therefore greatly affected.

Following step 214, the location of the preliminary matching set of pixel blocks relative to the search areas 706 is determined from the position in the global accumulator array having the lowest global absolute pixel difference. For example, if the lowest global absolute pixel difference is at position (1, 1) in the global accumulator array, then the pixel blocks in the preliminary matching set correspond to those at position (−8, −8) in their respective search areas 706. It is then determined whether the pixel blocks in the preliminary matching set have at least one side coincident with a border of their respective search areas (step 216). FIGS. 8A to 8H are diagrams of a portion of the consecutive video frame of FIG. 5 illustrating various positions of pixel blocks A1, A2 and A4 in their respective search areas 706 where the pixel blocks have at least one side coincident with a border of their respective search areas 706.

Figure 9:
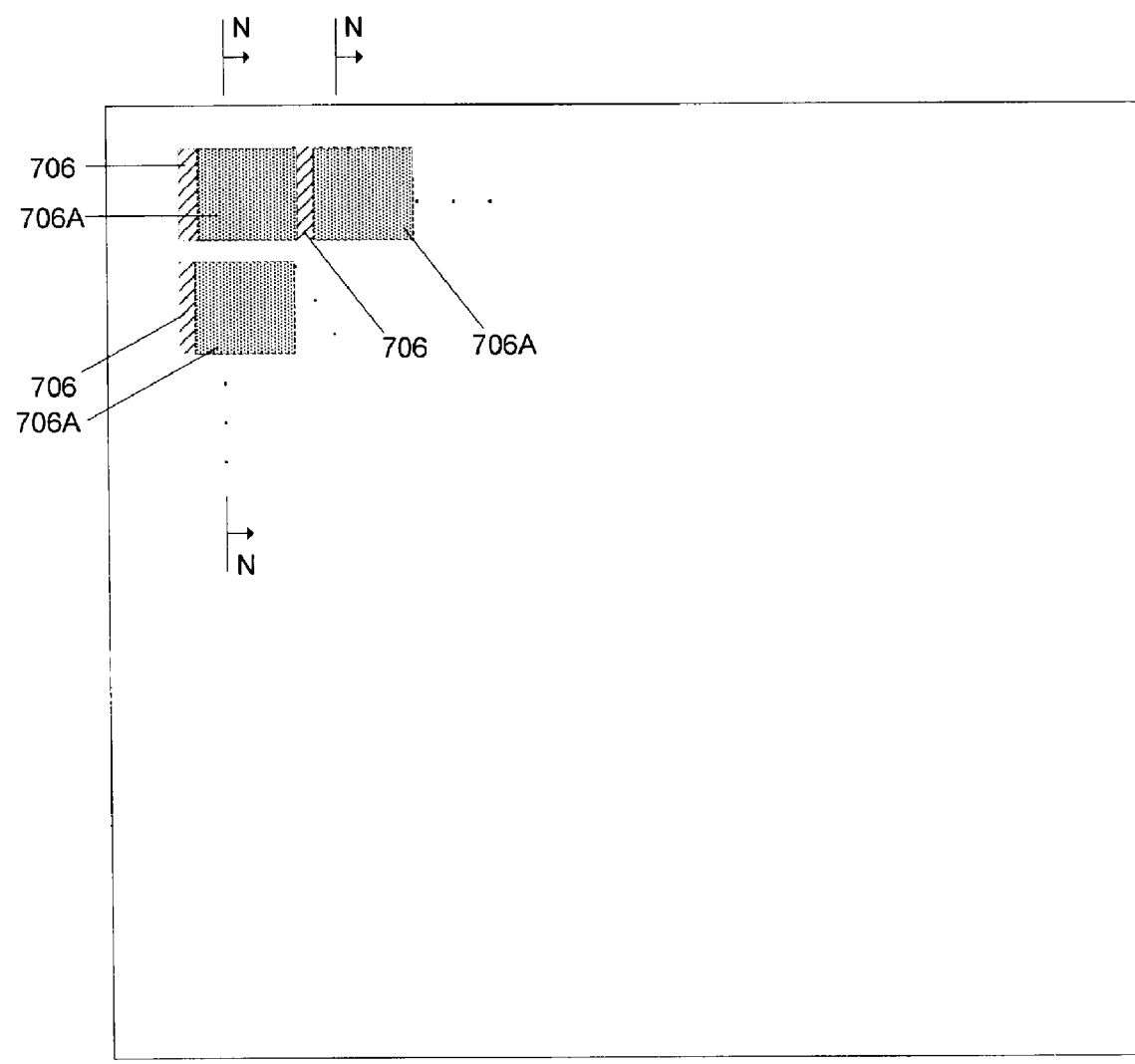
FIG. 9 is a diagram of a portion of the consecutive video frame of FIG. 5 showing shifting of the search areas by a selected amount.

It will be appreciated that if the position of the pixel blocks in the preliminary matching set is within the range (−7, −7) to (+7, +7) in their respective search areas 706, then the pixel blocks in the preliminary matching set of pixel blocks will not have a side coincident with a border of their respective search areas 706. If the pixel blocks in the preliminary matching set do not have a side coincident with a border of their respective search areas, the preliminary matching set of pixel blocks is deemed to be the actual matching set of pixel blocks (step 218). Otherwise, if the pixel blocks in the preliminary matching set have at least one side coincident with a border of their respective search areas, the search areas are shifted in the direction of the preliminary matching set of pixel blocks by N pixels (step 220). FIG. 9 shows the shifting of the search areas. In this case, the search areas 706 are shifted by N pixels to the right resulting in shifted search areas 706A.

Once the search areas have been shifted, pixel block comparisons similar to those described above with reference to step 214 are then conducted. In this case, the pixel blocks in the first video frame are compared with corresponding pixel blocks within associated shifted search areas 706A in the consecutive video frame in order to determine the actual matching set of pixel blocks (step 222).

Once the actual matching set of pixel blocks has been designated either at step 218 or at step 222, a check is performed to determine whether the designated actual matching set of pixel blocks is a reliable match (step 224). In order to determine whether the designated actual matching set of pixel blocks is a reliable match, the average of the global absolute pixel differences in the global accumulator array is determined. The average global absolute pixel difference is then divided by the total number of pixels in the actual matching set of pixel blocks to obtain a frame contrast measure according to Equation 1 below:

$$\text{Frame Contrast Measure} = \text{Average of Absolute Pixel Differences/Total Pixels} \quad (1)$$

If the frame contrast measure is greater than or equal to a contrast threshold value, equal to 0.08 in this embodiment, the designated actual matching set of pixel blocks is deemed to be reliable. Otherwise, if the frame contrast measure is less than the contrast threshold, the average global absolute pixel difference is divided by the lowest global absolute pixel difference in the global accumulator array to obtain a steepness measure according to Equation 2 below:

$$\text{Steepness Measure} = \text{Average of Absolute Pixel Differences/Minimum Difference} \quad (2)$$

The steepness measure is then multiplied by the frame contrast measure to obtain a product according to Equation 3 below:

$$\text{Product} = (\text{Frame Contrast Measure} * \text{Steepness Measure}) \quad (3)$$

If the product is greater than or equal to a product threshold value, equal to ⅙ in this embodiment, the designated actual matching set of pixel blocks is deemed to be reliable. Otherwise, the designated actual matching set of pixel blocks is deemed to be unreliable. In this case, global inter-frame jitter is considered to be zero (step 228).

If the designated actual matching set of pixel blocks is deemed to be reliable at step 224, a two-dimensional global inter-frame jitter vector is determined based on the position in the global accumulator array storing the lowest global absolute pixel difference (step 226). For example, if the lowest global absolute pixel difference is stored at position (1, 1) in the global accumulator array, then the pixel blocks in the actual matching set correspond to those at position (−8, −8) in their respective search areas 706. The two-dimensional global inter-frame jitter vector is therefore (−8, −8). In order to achieve sub-pixel accuracy, interpolation based on the position of the actual matching set of pixels and its four (4) neighbors, is conducted.

If the search areas 706 have been shifted at step 220, N is added to the global inter-frame jitter vector in the shift direction.

The general principle of pixel comparisons described above involves comparing luminance differences between a pixel subset of one video frame and a plurality of matching candidate sets of pixel blocks in the consecutive video frame. The candidate set of pixel blocks in the consecutive video frame that differs the least from the pixel subset in the first video frame is considered to be its match, and it is on this basis that global inter-frame jitter is estimated. Monochrome frame matching reliability is increased by comparing overall absolute pixel differences between the video frames. Because overall absolute pixel differences are employed, multiple block jitter vectors are not required for aggregation. Rather, consistent with human perception of motion between the video frames, global inter-frame jitter is calculated based on the motion of the majority of the pixels between consecutive video frames. Also, by using a search area that is shifted only under certain conditions, frame matching calculations are at most doubled.

Figure 10:
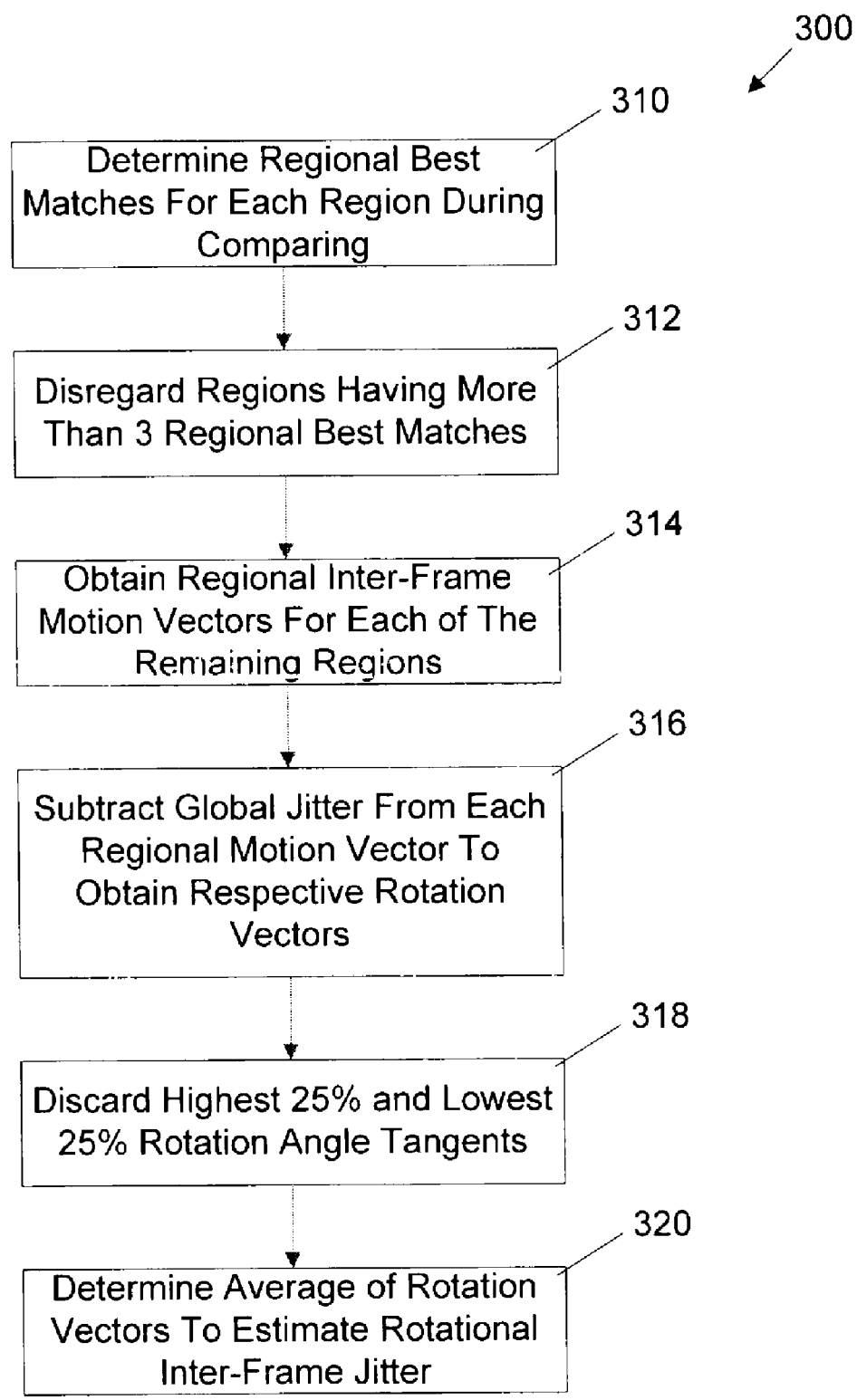
FIG. 10 is a flowchart showing the steps for performing region matching to estimate rotational inter-frame jitter.

FIG. 10 is a flowchart showing the steps performed during region matching to estimate rotational inter-frame jitter. Region matching is only performed with pixel regions not proximate to the video frame center (i.e. all pixel regions except for pixel region E in FIG. 4), since even under significant rotation the majority of the pixel blocks in the center pixel region of the video frame will not have rotated between video frames sufficiently to provide a different region match. As such, there is little rotation information to be gained from the center region's pixel blocks during region matching.

During rotational inter-frame jitter estimation, the lowest absolute pixel difference in each of the regional accumulator arrays defined for pixel regions A to I is determined, and is designated as corresponding to the best regional matching set of pixel blocks for that pixel region, with the exception of pixel region E for the reasons given above (step 310).

If the regional accumulator array for a pixel region has more than three equal lowest absolute pixel differences and hence, more than three potential best regional matching sets of pixel blocks, the pixel region is disregarded as unreliable (step 312). Regional inter-frame motion vectors between each remaining pixel region and its best regional matching set of pixel blocks are calculated based on the relative position of the pixel region and its best regional matching set of pixel blocks (step 314). For example, if the lowest regional absolute pixel difference for pixel region A is stored at position (1, 1) in the regional accumulator array, then the best regional matching set of pixel blocks correspond to those at position (−8, −8) in their respective search areas. The regional inter-frame motion vector for pixel region A is therefore (−8, −8).

If the search areas have been shifted at step 220 by N pixels, N is added to each of the regional inter-frame motion vectors in the shift direction.

The global inter-frame jitter vector obtained previously is then subtracted from each of the regional inter-frame motion vectors to obtain respective rotation inter-frame motion vectors (step 316). Rotation angle tangent vectors are then calculated (step 317) according to the relationship shown in Equation 4 below:

$$\tan(\alpha_i) = \frac{x_i * \Delta y_i - y_i * \Delta x_i}{x_i * (x_i + \Delta x_i) + y_i * (y_i + \Delta y_i)} \quad (4)$$

where:

α$_i$ is the rotation angle of region i;

(x$_i$, y$_i$) are the coordinates of region i relative to the video frame center; and (Δx$_i$, Δy$_i$) is the inter-frame motion vector of region i.

The rotation angle tangent vectors are median filtered to discard those with the highest 25% and lowest 25% angle tangents (step 318), and an average of the remaining rotation angle tangent vectors is deemed to be the rotational inter-frame jitter vector thereby to estimate rotational inter-frame jitter (step 320).

Figure 11:
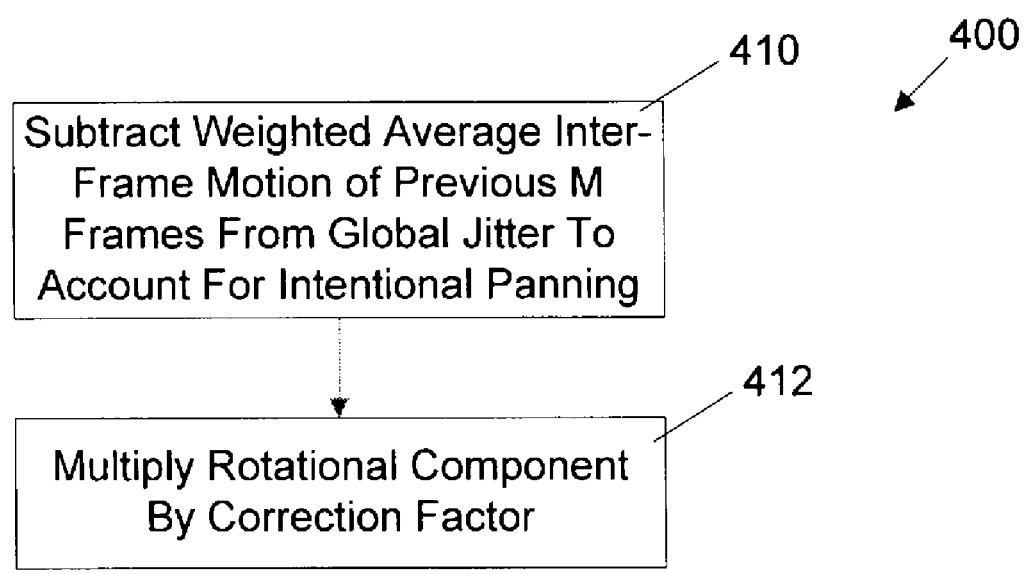
FIG. 11 is a flowchart showing the steps for correcting for intentional motion and cumulative error.

FIG. 11 is a flowchart showing the steps performed during correction of the global and rotational inter-frame jitter vectors to take intentional motion and cumulative error into account. To correct for intentional motion due to panning, a weighted average of the global inter-frame jitter vectors calculated for M previous video frames (i.e. the "panning window") is subtracted from the global inter-frame jitter vector (step 410). The value of panning window M depends partly on the video frame capture rate and a parameter representing the maximum allowable width of an undefined area between the two consecutive video frames. The undefined area represents parts of the video frames that do not correspond due to either jitter or intentional panning. A panning window value of between five (5) and the video frame capture rate is typically suitable. The panning window value M may be chosen based on the number of video frames required for undefined areas to completely disappear after motion has ceased. Subtracting the weighted average of the global inter-frame jitter vectors calculated for the M previous video frames also reduces possible cumulative error in linear motion estimation.

The weighting coefficients are chosen to provide for smooth intentional motion, and their sum total is equal to one (1). For example, where the panning window value M=5, the coefficients chosen may be ⅛, ¼, ¼, ¼, and ⅛.

To correct for accumulated error in the rotational inter-frame jitter vector, the tangent of the rotation angle is multiplied by a correction factor having a value less than one (1) (step 412). In this embodiment, the correction value is equal to 0.9.

Figure 12:
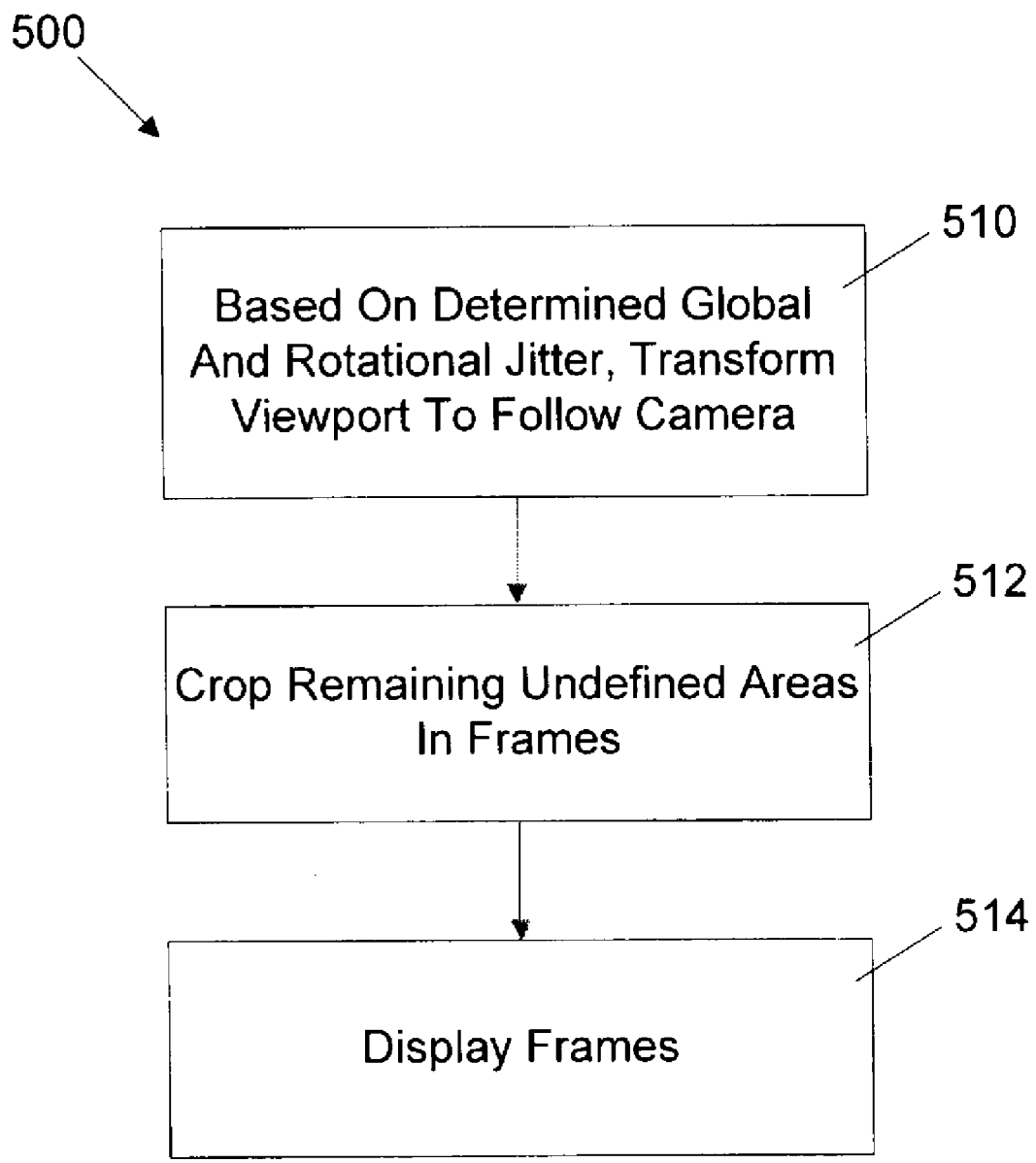
FIG. 12 is a flowchart showing the steps for transforming and displaying the video frames based on the estimated global and rotational inter-frame jitter.

FIG. 12 is a flowchart showing the steps performed during transformation of the video frames to compensate for jitter to place the video frames into condition for display by the video capture device. Based on the determined global and rotational inter-frame jitter, the viewport (i.e. the portion of the video frames to be subsequently displayed) is transformed to follow the video capture device's movement (step 510). That is, the viewport is shifted and rotated in accordance with the global and rotational inter-frame jitter estimations thereby to cancel the frame to frame jitter. Remaining undefined areas within the viewport (i.e. those areas with no matching counterparts in the first video frame) are cropped (step 512), resulting in the video frame being displayed at a smaller size. The jitter-compensated video frames are then displayed in a conventional manner (step 514).

Figure 13:
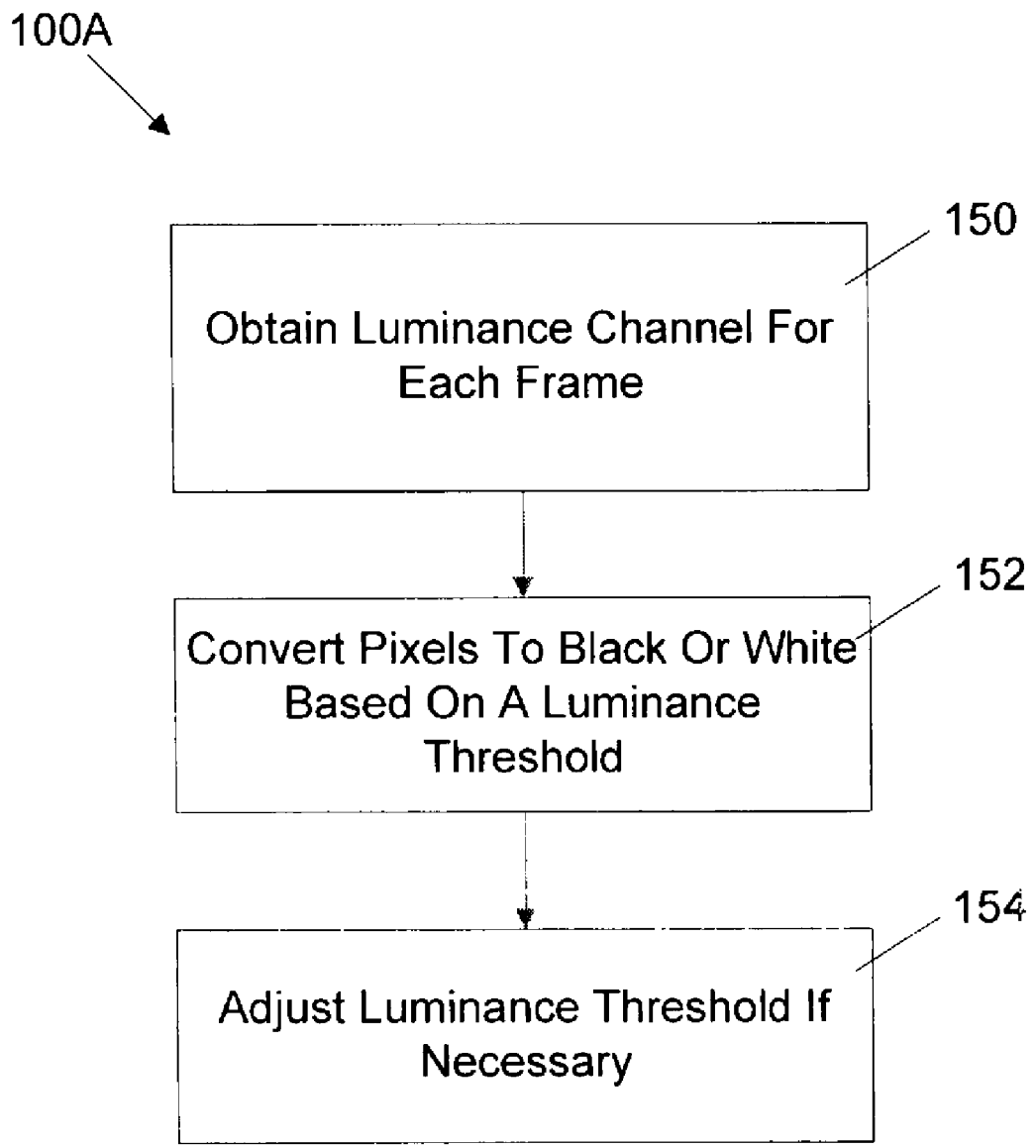
FIG. 13 is a flowchart showing alternative steps for converting the frames to monochrome using a luminance threshold.

Although an embodiment of jitter estimation and correction between consecutive video frames has been described above, those of skill in the art will appreciate that variations are possible. For example, FIG. 13 is a flowchart showing alternative steps 100A for converting the video frames to monochrome using a luminance threshold. In this embodiment, the luminance threshold is initially set to a default value equal to one hundred and twenty-seven (127). The Y-channel for both video frames is then obtained (step 150), and the pixels of the video frames are converted to either black or white based on their Y-channel values relative to the luminance threshold (step 152). For example, if the Y-channel value of a pixel is greater than or equal to the luminance threshold, the pixel is converted to pure white. Otherwise, the pixel is converted to pure black. The luminance threshold is then checked to determine if its initial value requires adjustment (step 154) for subsequent video frame monochrome conversions.

Figure 14:
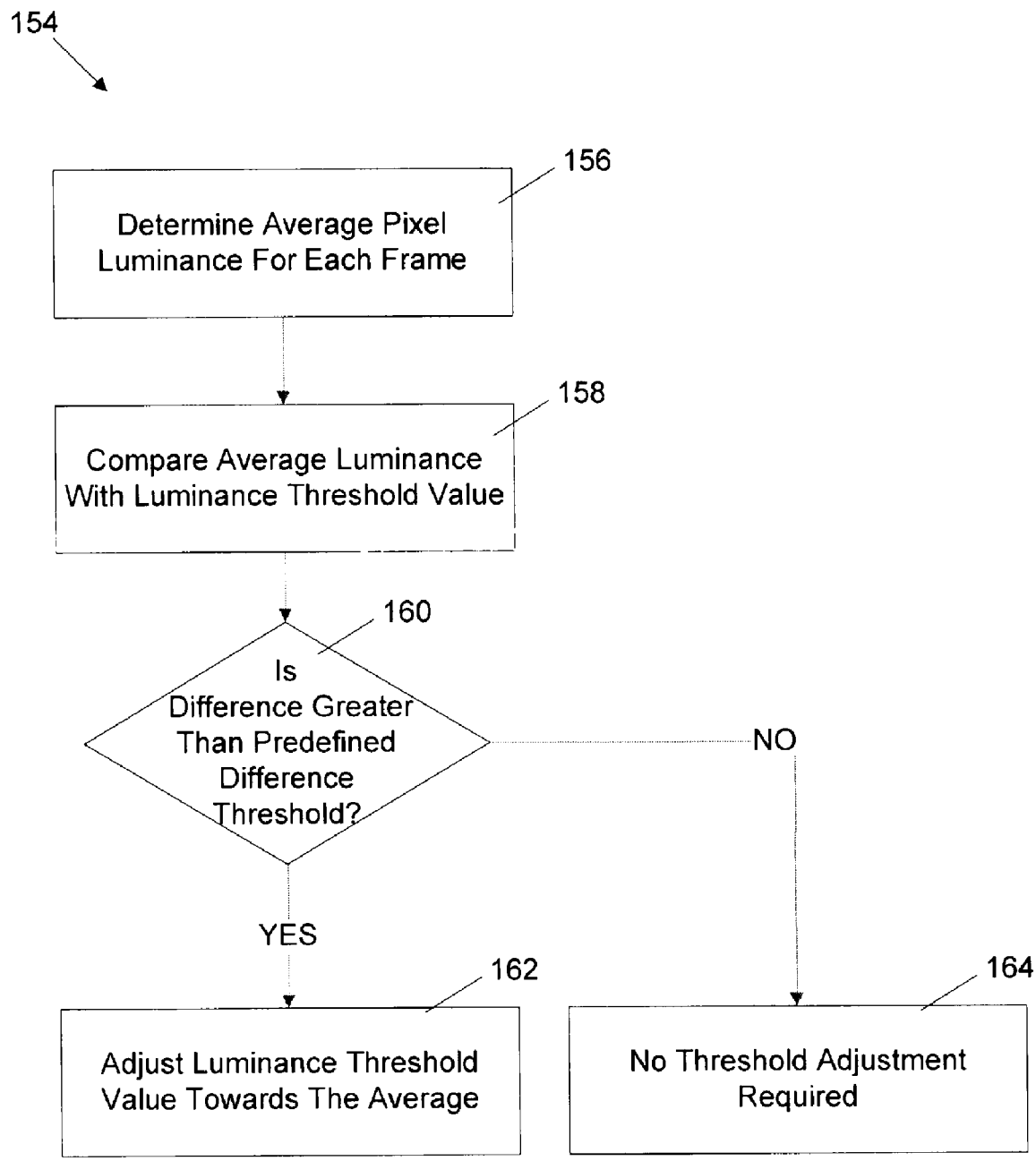
FIG. 14 is a flowchart showing the steps for adapting a luminance threshold during the alternative steps of FIG. 13.

FIG. 14 is a flowchart showing the steps performed during adjusting of the luminance threshold. The average luminance of the pixels in the video frames is first determined (step 156) and then compared with the current luminance threshold (step 158). If the difference between the average luminance and the luminance threshold is greater than or equal to a difference threshold (step 160), then the luminance threshold is adjusted towards the average luminance value (step 164) by a small amount. The amount of the adjustment is typically determined by experimentation. Otherwise, if the difference between the average luminance and the luminance threshold is less than the difference threshold, no luminance threshold adjustment is required (step 162).

Figure 15:
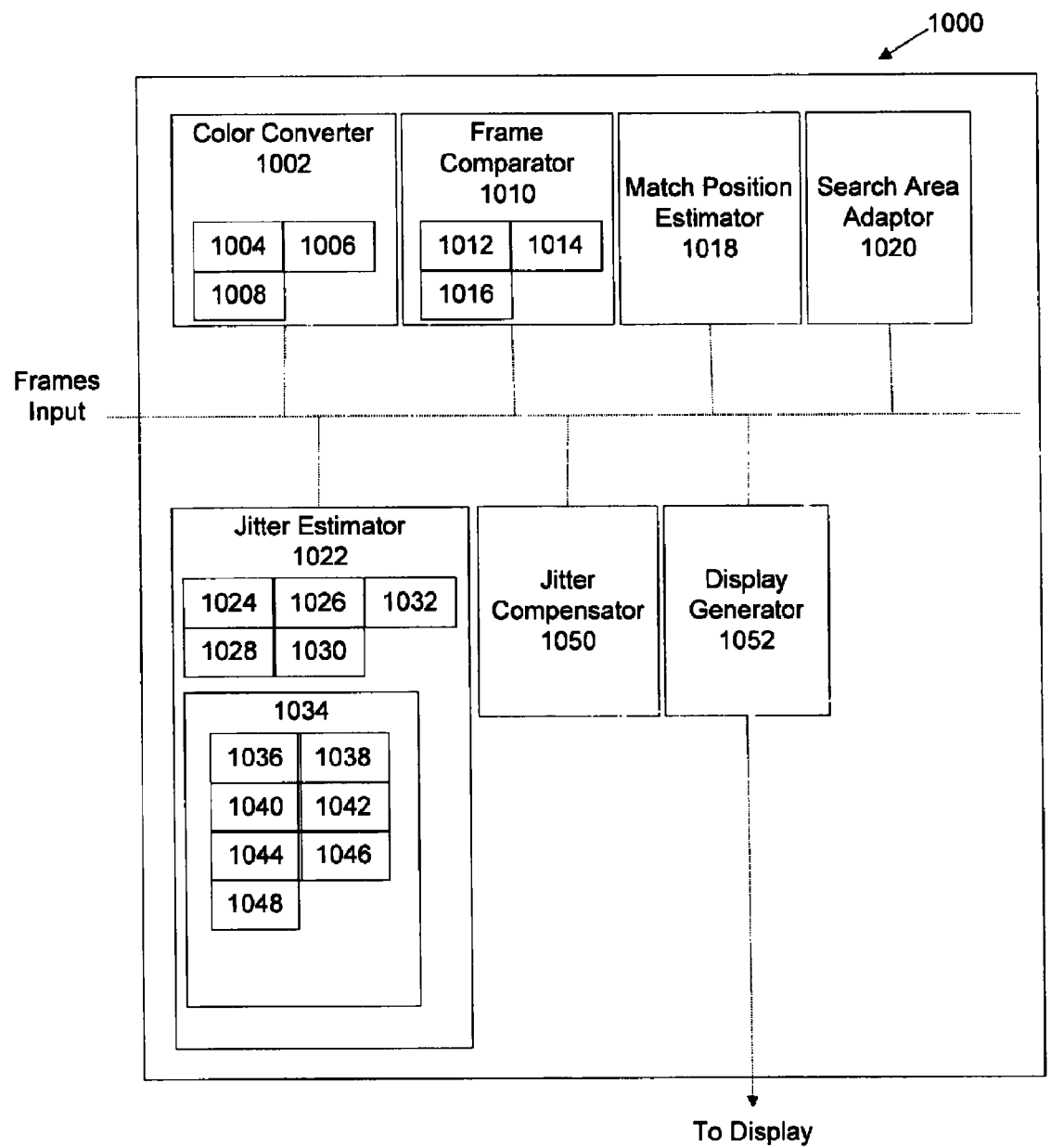
FIG. 15 is a block diagram of an apparatus for estimating and compensating for jitter between video frames in a digital video sequence.

FIG. 15 is a block diagram showing an apparatus 1000 for estimating and compensating for jitter between video frames in a digital video sequence in accordance with the method described above. In this embodiment, apparatus 1000 comprises a color converter 1002, a frame comparator 1010, a match position estimator 1018, a search area adaptor 1020, a jitter estimator 1022, a jitter compensator 1050, and a display generator 1052.

Color converter 1002 comprises a luminance calculator 1004, an optional bit plane selector 1006 and a luminance threshold adapter 1008. Frame comparator 1010 comprises a pixel subset definer 1012, a region generator 1014, and a difference accumulator module 1016. Jitter estimator 1022 comprises a global jitter estimator 1024, a global jitter reliability module 1026, a calculator 1028, a threshold comparator 1030, a panning corrector 1032 and a rotational jitter estimator 1034.

The rotational jitter estimator 1034 comprises a region comparator 1036, a regional motion reliability module 1038, a regional motion calculator 1040, a tangent calculator 1042, an averaging calculator 1046, a median filter 1044, and a rotational component error corrector 1048.

The operation of apparatus 1000 will now be described. In the following description, the conversion of the frames to monochrome is conducted using an adaptable luminance threshold, rather than bit plane selection. As such, bit plane selector 1006 of color converter 1002 is not employed.

In operation when a pair of consecutive video frames are to be examined to estimate and correct for jitter, the frame comparator 1010 compares a set of pixel blocks in the first frame to matching candidate sets of pixel blocks within respective search areas in the consecutive frame to determine a preliminary matching candidate set of pixel blocks. Match position estimator 1018 determines whether to designate the preliminary matching candidate set of pixel blocks as the actual matching set of pixel blocks or to select an alternative matching set of pixel blocks as the actual matching set of pixel blocks based on the position of the preliminary matching set of candidate pixel blocks relative to the search areas. Frame comparator 1010 in response to the match position estimator 1018 determines the actual matching set of pixel blocks. Jitter estimator 1022 in turn calculates global and rotational inter-frame jitter vectors thereby to estimate global and rotational inter-frame jitter. Jitter compensator 1050 transforms the video frames based on the estimated jitter by aligning the viewport of the video capture device with the video frames in accordance with the estimated jitter thereby to correct for or cancel the jitter. Display generator 1052 in turn crops non-corresponding areas of the video frames and then displays the video frames.

Frame comparator 1010 in this embodiment operates in the manner described above. As a result, color converter 1002 receives the consecutive video frames to be examined. Luminance calculator 1004 calculates the luminance value of each pixel in each of the video frames, and color converter 1002 converts each pixel in each of the video frames to black or white based on the luminance value of each pixel relative to the luminance threshold. Luminance threshold adaptor 1008 adjusts the luminance threshold in the event that an average luminance of pixels in the first frame differs from the luminance threshold by more than a difference threshold.

Region generator 1014 defines rectangular regions and their corresponding regional accumulator arrays. Region generator 1014 also defines the global accumulator array. Pixel subset definer 1012 defines the set of pixel blocks in the first video frame to be compared with candidate sets of pixel blocks in search areas of the consecutive video frame.

Difference accumulator module 1016 accumulates regional absolute pixel differences in respective regional accumulator arrays as the set of pixel blocks is compared to each of the candidate sets of pixel blocks for each position in the search areas. Difference accumulator module 1016 also accumulates the global absolute pixel differences in the global accumulator array from the regional accumulator arrays for each position in the search areas allowing the preliminary matching set of pixel blocks to be determined. Match position estimator 1018 determines the position of the preliminary matching set of pixel blocks relative to the search areas to determine whether to designate the preliminary matching set of pixel blocks as the actual matching set of pixel blocks. If required, match position estimator 1018 shifts the search areas and conditions the difference accumulator module 1016 to calculate regional and global absolute pixel differences in the shifted search areas thereby to determine the actual matching set of pixel blocks.

Global jitter reliability module 1026 determines the reliability of the actual matching set of pixel blocks in the manner described previously. Global jitter reliability module 1026 includes calculator 1028 for calculating the average of the global absolute pixel differences. Calculator 1028 divides the average of the global absolute pixel differences by the total number of pixels in the actual set of matching pixel blocks to obtain the frame contrast measure. Threshold comparator 1030 deems the actual candidate matching set of pixel blocks to be reliable in the event that the frame contrast measure is greater than or equal to the contrast threshold.

If the frame contrast measure is less than the contrast threshold, threshold comparator 1030 causes calculator 1028 to divide the average global absolute pixel difference by the minimum global absolute pixel difference to obtain the steepness measure. Calculator 1028 calculates the product of the steepness measure and the frame contrast measure. Threshold comparator 1030 deems the actual matching pixel block to be reliable if the product is greater than or equal to the product threshold.

To estimate rotational inter-frame jitter between the video frames, region comparator 1036 determines one or more regional matches in the consecutive video frame from the regional accumulator arrays. Regional motion calculator 1040 calculates regional motion between each of the regions and its regional match. Regional motion reliability module 1038 disregards a region as unreliable in the event that it has greater than three potential regional matches. Tangent calculator 1042 subtracts the global inter-frame jitter vector from each of the regional motion vectors to obtain respective rotation angle tangents. Median filter 1044 filters the rotation angle tangents to discard those with the highest 25% and lowest 25% angle tangents, and averaging calculator 1046 averages the remaining rotation angle tangents to yield the rotational inter-frame jitter vector.

Error corrector 1048 multiplies the rotational inter-frame jitter vector by the correction factor to correct for accumulated error. Panning corrector subtracts the weighted average of global inter-frame jitter vectors calculated for previous frames from the global inter-frame jitter vector to account for intentional panning during capture of the digital video sequence. The corrected global and rotational inter-frame jitter vectors represent the estimated jitter.

Jitter compensator 1050 transforms the video frames based on the estimated jitter by transforming the viewport to follow the video capture device. That is, the viewport is shifted and rotated in accordance with the global and rotational inter-frame jitter estimations. Display generator 1052 displays the video frames including cropping undefined areas within the viewport (i.e. those areas with no matching counterparts in the first frame).

Where conversion of the video frames to monochrome is to be performed using bit plane selection, bit plane selector 1006 selects the bit plane in response to the average luminance measures calculated by luminance calculator 1004. Color converter 1002 then sets each pixel in the first and consecutive video frames to one of black and white based on the selected bit plane.

Figure 16:
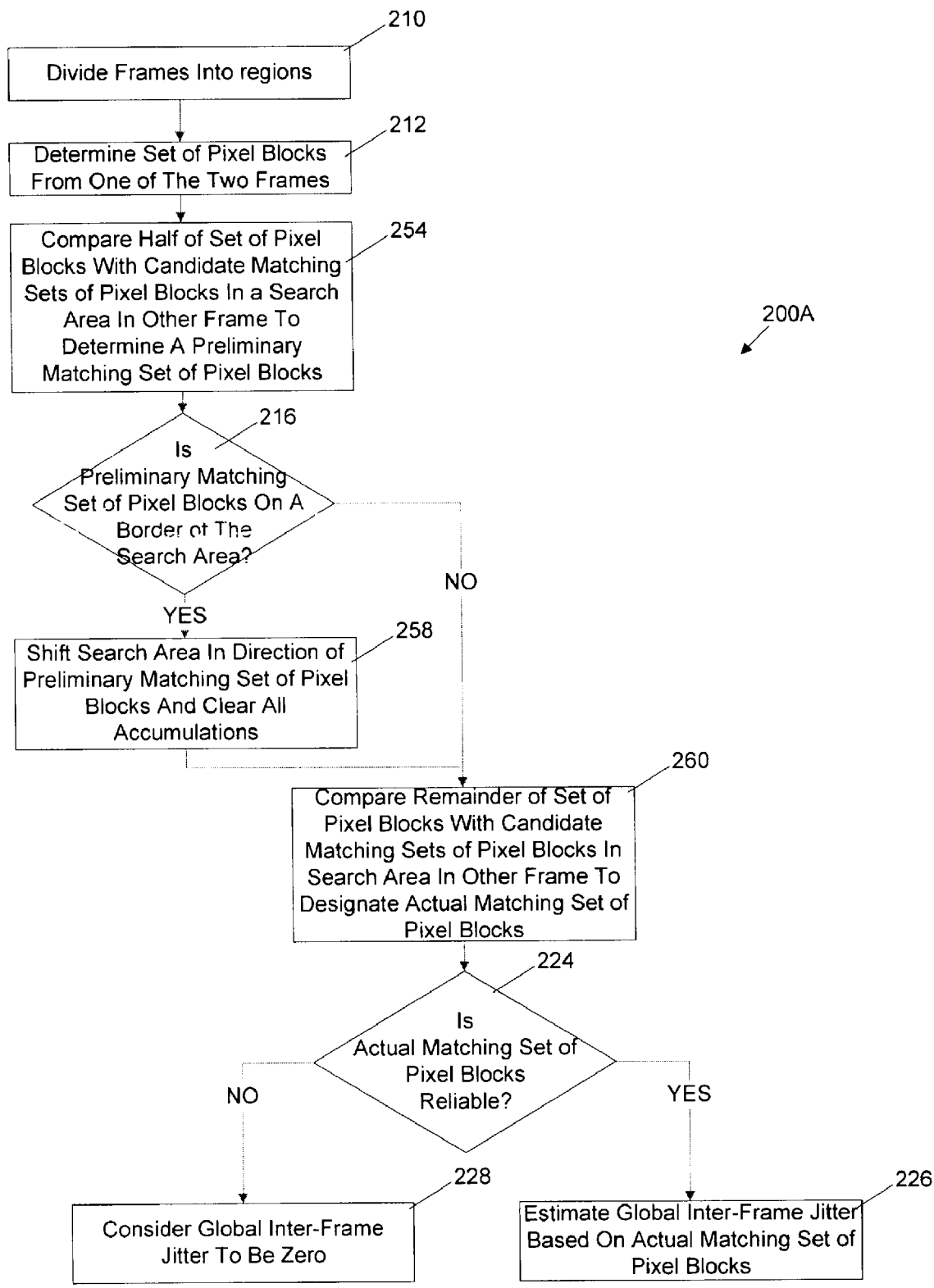
FIG. 16 is a flowchart showing alternative steps for performing frame matching to obtain global inter-frame jitter.
Figure 17A:
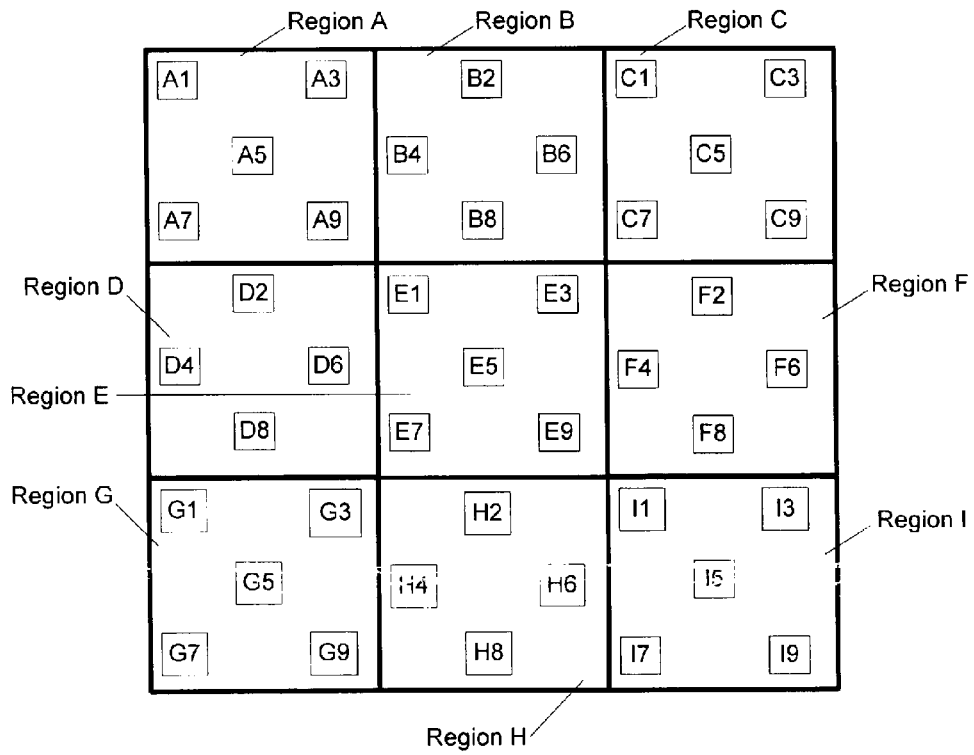
FIGS. 17A and 17B are diagrams of the first video frame of FIG. 4 divided into regions, each region having a plurality of pixel blocks, the plurality of pixel blocks divided into two halves for initial comparing according to the alternative steps in FIG. 16.

FIG. 16 is a flowchart showing alternative steps 200A for performing pixel block comparisons to estimate global inter-frame jitter. According to this embodiment, following steps 210 and 212 search areas for a first half of the pixel blocks in the first video frame as shown in FIG. 17A are defined in the consecutive video frame (i.e. for A1, A3, A5, A7, A9, B2, B4, B6, B8, C1, C3 etc.). The first half of the pixel blocks in the first video frame is then compared to corresponding pixel blocks in the consecutive video frame within respective search areas 706 to populate the regional and global accumulator arrays and determine a preliminary matching set of pixel blocks (step 254).

Following step 254, it is then determined whether the pixel blocks in the preliminary matching set have at least one side coincident with a border of their respective search areas (step 216).

Figure 17B:
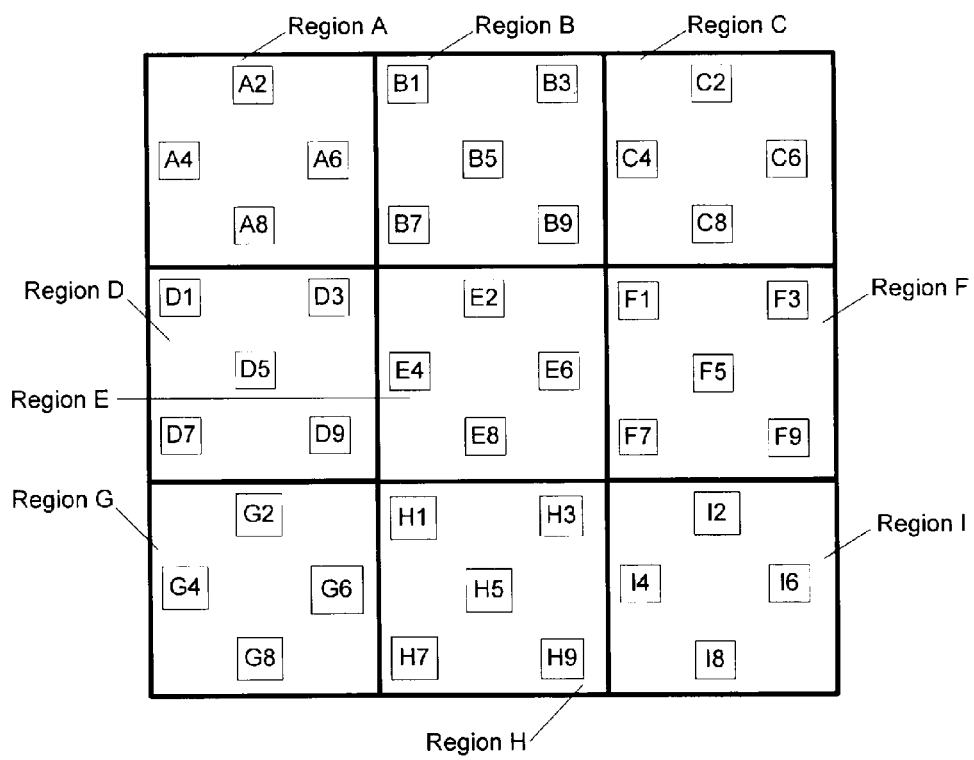

If the pixel blocks in the preliminary matching set of pixel blocks do not have at least one side coincident with a border of their respective search areas, the actual matching set of pixel blocks is expected to be within respective ones of the existing search areas 706, and the other half of the pixel blocks (i.e. A2, A4, A6, A8, B1, B3, B5, B7, B9 etc.) is compared to their corresponding pixel blocks in respective ones of the search areas 706 (step 260). The other half of the pixel blocks is shown in FIG. 17B.

The absolute pixel differences for the other half of pixel blocks at each position within their respective search areas 706 are accumulated with the values stored at corresponding regional accumulator array positions. The preliminary matching set of pixel blocks is then designated as the actual matching set of pixel blocks.

Otherwise, if the pixel blocks of the preliminary matching set have at least one side coincident with a border of their respective search areas, the search areas are shifted in the direction of the preliminary matching set of pixel blocks by N pixels and the accumulations for the preliminary matching set of pixel blocks are discarded along with all of the calculated regional and global absolute pixel differences (step 258). That is, all positions in the regional and global accumulator arrays are set to zero (0). The pixel blocks in the other half of pixel blocks (i.e. A2, A4, A6, A8, B1, B3, B5, B7, B9 etc.) as shown in FIG. 17B are then compared to corresponding pixel blocks within respective shifted search areas in order to calculate absolute pixel differences and determine the actual matching set of pixel blocks (step 260).

It will be noted that if a shift of the search areas is conducted as described above, the total number of pixel blocks being compared and total number of absolute pixel differences calculated to yield the actual matching set of pixel blocks is about half that of the previously-described embodiment. This is because once the shifted search areas are determined, accumulations are only processed for the other half of the pixel blocks.

If the search area has been shifted at step 258 by N pixels, N is added in the shift direction to the global inter-frame jitter vector and each of the regional inter-frame motion vectors.

It will be understood that the pixel block comparisons may be performed in a different order. For example, in the embodiment described above, comparisons for pixel block A1 at each position within its respective search area are firstly calculated and the accumulations in the corresponding position of pixel region A's regional accumulator array stored, prior to calculating comparisons for pixel block A2 at each position within its respective search area, and so forth. However, if desired a single comparison for pixel block A1 at a particular position within its respective search area can be conducted, then a single comparison for pixel block A2 at that particular position, then a single comparison for pixel block A3 at that particular position, and so forth until a single comparison for pixel block 19 has been conducted at that particular position. Once all comparisons for pixel blocks A1 to 19 at the particular position have been processed, the positions of the pixel blocks are changed within their respective search areas and comparisons for pixel blocks A1 to 19 are conducted at the changed positions. This continues until the pixel blocks have been panned across the entire search areas.

Figure 18:
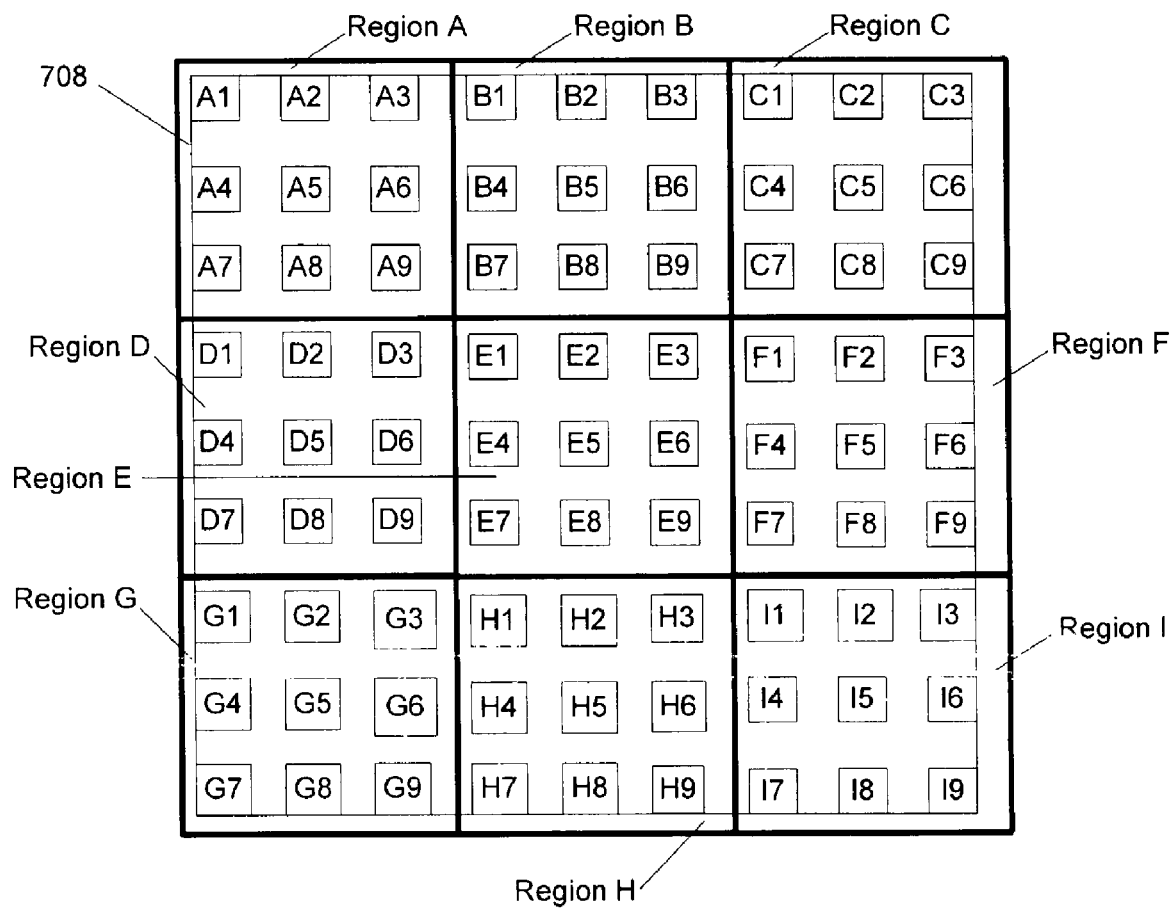
FIG. 18 is a diagram of a first video frame divided into regions, each region having a plurality of pixel blocks and a window surrounding the plurality of pixel blocks.
Figure 19:
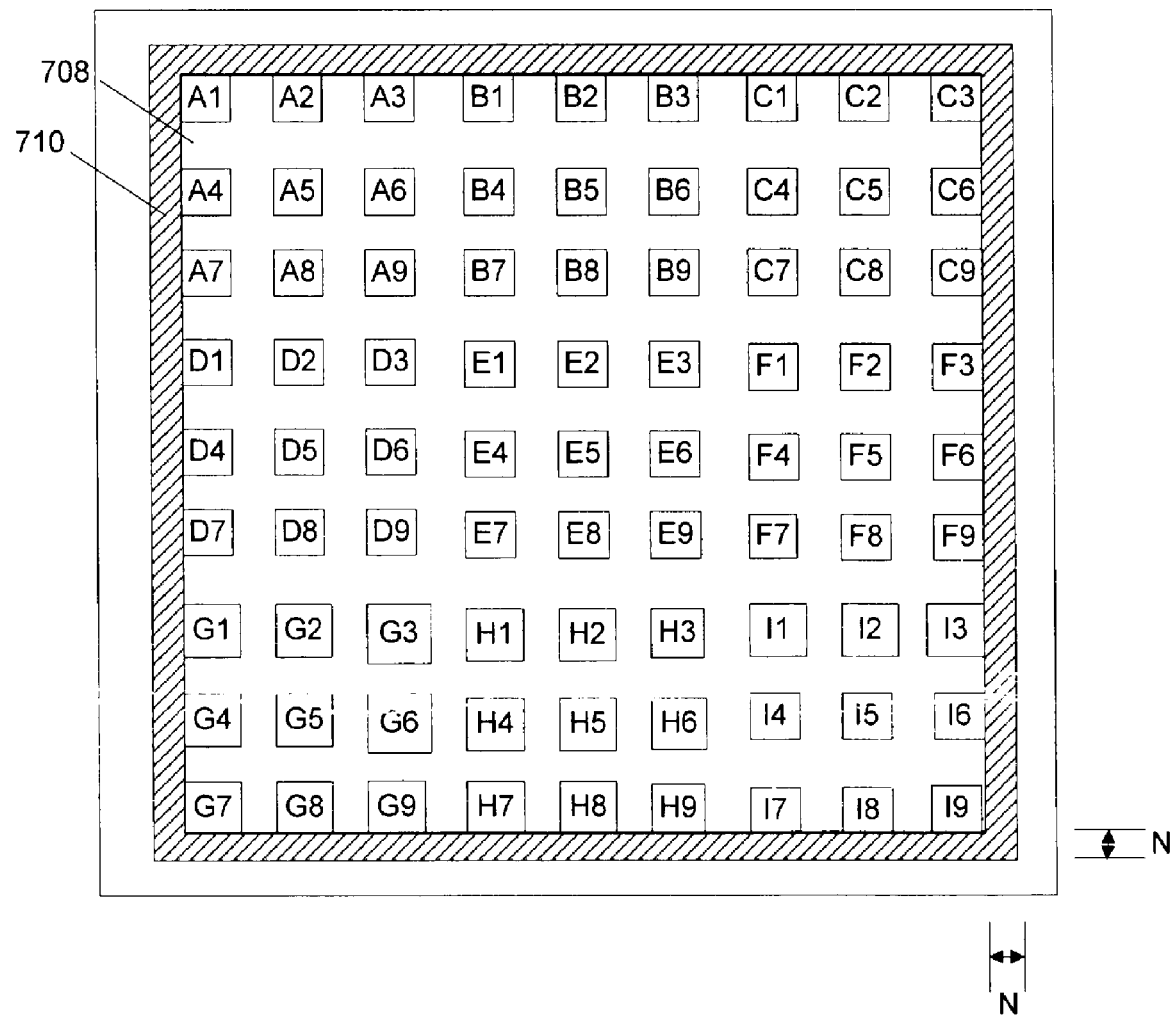
FIG. 19 is a diagram showing the window surrounding the plurality of pixel blocks of FIG. 18 overlying a single search area in the consecutive video frame.

FIG. 18 shows a first video frame similar to that shown in FIG. 4, with a window 708 surrounding the set of pixel blocks. A search area 710 is defined in the consecutive video frame including the pixels corresponding to those in window 708 as well as a surrounding band of N pixels, where N is a small number. FIG. 19 shows search area 710 in the consecutive video frame overlaid by window 708. The regional and global accumulator arrays are defined as described above.

Figure 20A:
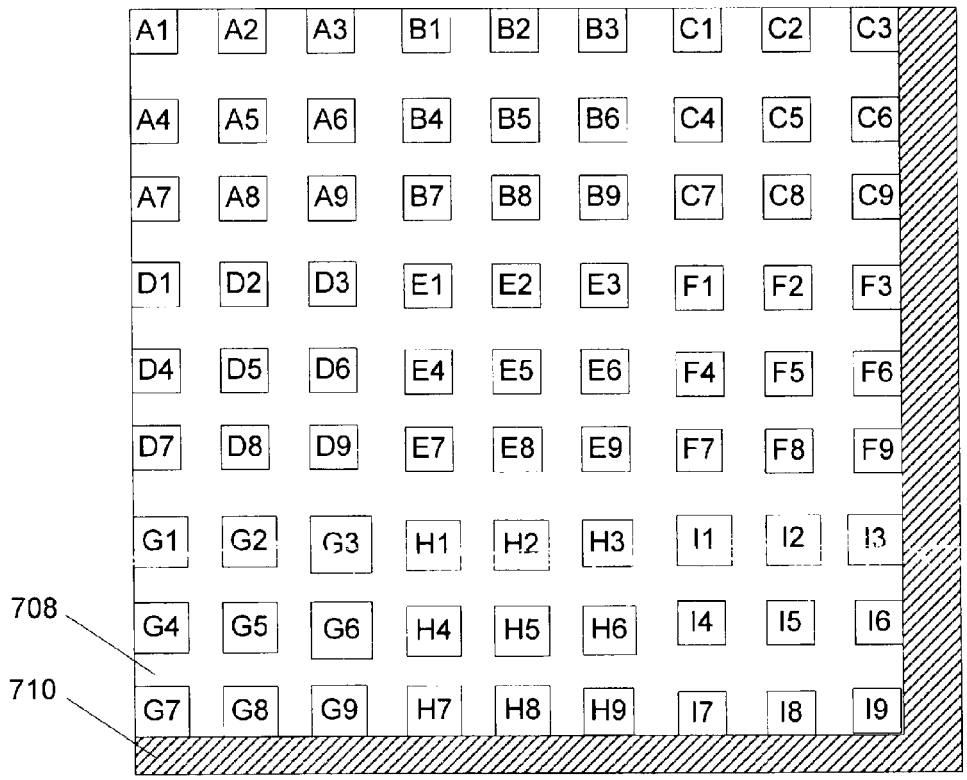
FIGS. 20A-20C are diagrams of the consecutive video frame with all pixel blocks in the window of FIG. 18 being progressively positioned within the single search area during frame matching.

Window 708 defined for the first video frame is then placed at the top left corner of the search area 710 (corresponding to the (−8, −8) position in the search area), as shown in FIG. 20A. The pixels of each pixel block are then compared with the corresponding pixels in the search area 710 and respective absolute pixel differences are calculated. The absolute pixel differences are accumulated and stored in respective positions of the regional accumulator arrays.

Figure 20B:
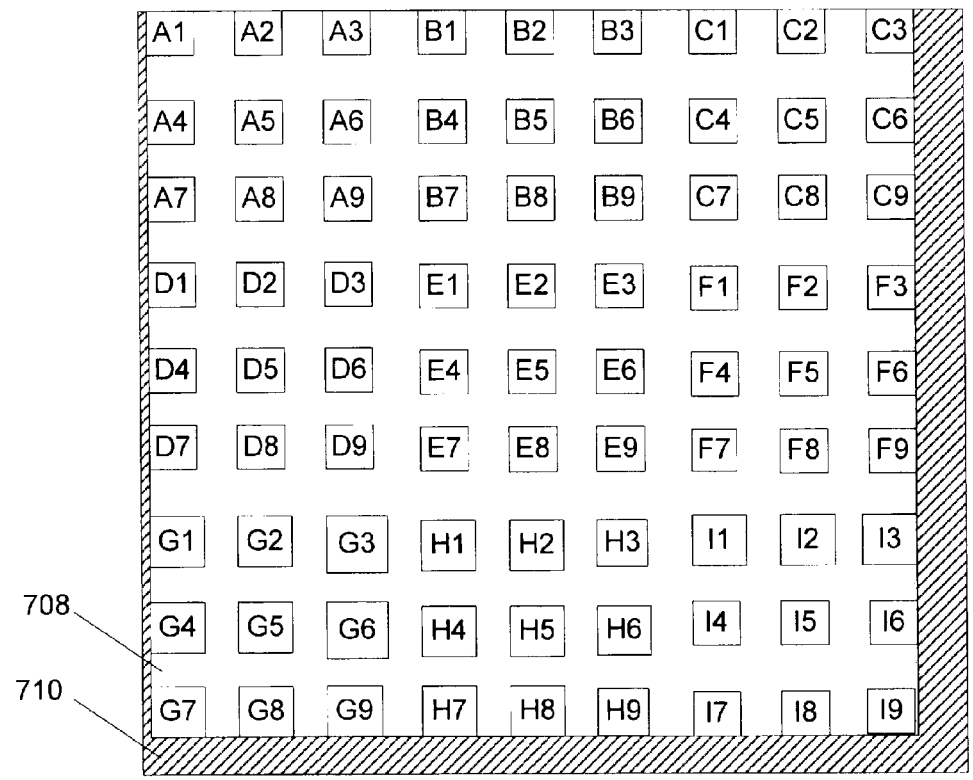
Figure 20C:
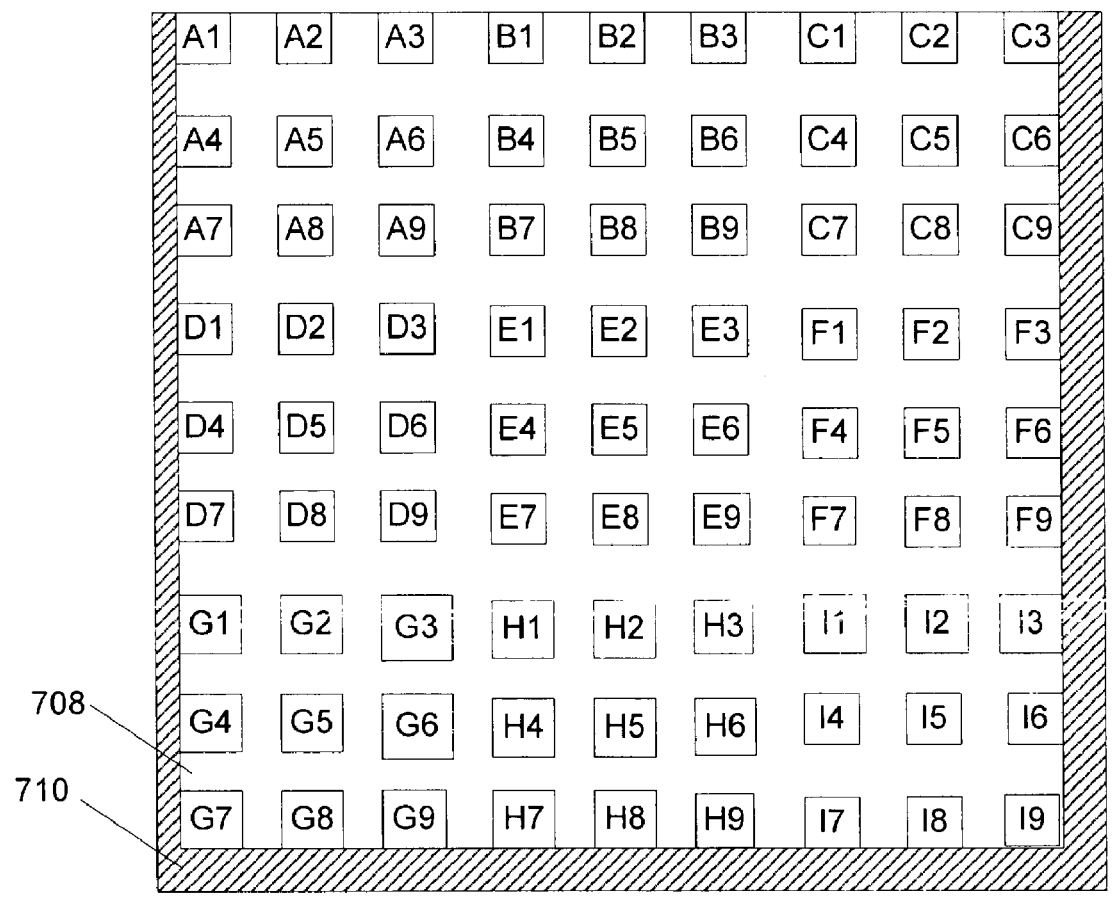

With each of the regional absolute pixel differences for the set of pixel blocks at the (−8, −8) window location determined, window 708 is shifted by one pixel within search area 710 as shown in FIG. 20B (corresponding to the (−8, −7) window position in the search area) and the above steps are performed again. The resulting absolute pixel differences are accumulated and stored in respective positions of the regional accumulator arrays. Shifting of the window within search area 710 is performed again as shown in FIG. 20C and so forth until all combinations of pixels with search area 710 corresponding in size to the window 708 have been processed thereby to populate each regional accumulator array.

Following the above, the global accumulator array is populated by summing the accumulated values stored in the regional accumulator arrays, and global and rotational inter-frame jitter is determined in the manner described previously.

Alternatively, the pixel block comparisons can be completed on a pixel region by pixel region basis i.e. the pixel blocks of region A pixel blocks can be processed prior to beginning processing of the region B pixel blocks etc.

It will be understood that the threshold values, bit values, pixel block and pixel region sizes, panning window values etc. described above are exemplary. It will also be appreciated by those of skill in the art that these values and sizes may be altered to suit the particular environment in which jitter estimation and correction is being employed.

For example, while the embodiments above have been described as having nine (9) pixel regions of equal size, other numbers of pixel regions of equal size may be chosen based on the size of the video frames. Furthermore, while nine (9) pixel blocks per pixel region have been described, it will be understood that more or fewer pixel blocks per pixel region may be selected, depending upon the number of pixels in each pixel block. In this embodiment, because the video frames are converted to monochrome, comparing too few pixels will not yield reliable results. On the other hand, comparing too many pixels will cause a decrease in speed of processing. The number of pixel blocks per pixel region is therefore selected to achieve a balance.

While conversion of the video frames to monochrome prior to comparing is advantageous for reducing processing time and required storage, it will be understood that the methods of frame and region matching described above can be conducted on video frames that have not been converted to monochrome.

Furthermore, in the embodiments described above, both global and rotational inter-frame jitter have been calculated. However, in the event that detection of rotational inter-frame jitter is not desired, global inter-frame jitter may be calculated by directly populating the global accumulator array with the calculated absolute pixel differences. In such a case, regional accumulator arrays are not required.

Although embodiments have been described, those of skill in the art will appreciate that variations and modifications may be made without departing from the spirit and scope thereof as defined by the appended claims.

What is claimed is:

1. A method of estimating jitter between two video frames in a digital video sequence, comprising:

comparing a pixel subset of one video frame to candidate pixel subsets within a search area in the other video frame to determine a preliminary matching pixel subset from the candidate pixel subsets;

determining an actual matching pixel subset from the other video frame based on the location of the preliminary matching pixel subset relative to said search area; and calculating a global jitter vector based on the pixel subset and the actual matching pixel subset thereby to estimate the jitter;

checking the reliability of the actual matching pixel subset; and only calculating the global jitter vector if the actual matching pixel subset is deemed to be reliable;

wherein reliability of the actual matching pixel subset is based on at least one of frame contrast measure and steepness measure; and wherein said determining comprises:

determining if the preliminary matching pixel subset is adjacent a border of the search area;

if not, designating the preliminary matching pixel subset as the actual matching pixel subset;

otherwise, altering the search area; and comparing the pixel subset to candidate pixel subsets within the altered search area to determine the actual matching pixel subset;

wherein said altering comprises:

shifting the search area in the direction of the preliminary matching pixel subset.

2. The method of claim 1, wherein said determining is based on the location of the preliminary matching pixel subset relative to the boundary of said search area.

3. The method of claim 1, wherein the preliminary matching pixel subset is designated as the actual matching pixel subset if the preliminary matching pixel subset does not have a border coincident with a border of the search area.

4. The method of claim 3, wherein said search area comprises pixels corresponding to the pixels of the pixel subset in the one video frame together with a band of surrounding pixels.

5. The method of claim 4, wherein the width of the band is equal to the distance the search area is shifted.

6. The method of claim 4, wherein said pixel subset comprises a set of pixel blocks, said pixel blocks being distributed across said one video frame.

7. The method of claim 6, wherein said comparing comprises comparing pixel blocks of the one video frame with corresponding pixel bocks within search areas of the other video frame to determine a preliminary matching set of pixel blocks.

8. The method of claim 7, wherein during the pixel block comparing, absolute differences between pixels of the pixel blocks and pixels of the search areas are calculated and accumulated thereby to determine the preliminary matching set of pixel blocks.

9. The method of claim 6, wherein said pixel blocks are evenly distributed across said one video frame.

10. The method of claim 1, further comprising:

prior to the comparing, converting the video frames to monochrome.

11. The method of claim 10, wherein the converting comprises:

converting each pixel in the video frames to black or white based on a luminance value of each pixel relative to a luminance threshold.

12. The method of claim 11, wherein the luminance threshold is adjustable.

13. The method of claim 12, wherein the luminance threshold is adjusted when an average luminance of pixels in the one video frame differs from the luminance threshold by greater than a difference threshold amount.

14. The method of claim 11, wherein the converting comprises:

calculating overall luminance measures for each of the video frames;

selecting a bit plane based on an average of the overall luminance measures; and setting each pixel in the video frames to one of black and white based on the selected bit plane.

15. The method of claim 14, wherein the overall luminance measures are video frame luminance averages.

16. The method of claim 1, further comprising:

calculating rotational jitter between the video frames.

17. The method of claim 16, further comprising:

multiplying the rotational jitter by a correction factor to correct for accumulated error.

18. The method of claim 1, further comprising:

subtracting a weighted global jitter average of a previous M video frames from the global jitter vector to account for intentional panning during capture of the digital video sequence.

19. The method of claim 1, further comprising:

transforming the video frames based on the estimated jitter.

20. The method of claim 19, wherein the transforming comprises:

aligning a viewport with the video frames in accordance with the estimated jitter.

21. The method of claim 20, further comprising:

displaying the video frames, during display non-corresponding areas of the video frames being cropped.

22. An apparatus for estimating jitter between two video frames in a digital video sequence, comprising:

a frame comparator comparing a pixel subset of one video frame to candidate pixel subsets within a search area in the other video frame to determine a preliminary matching pixel subset from the candidate pixel subsets;

a match position estimator determining the location of the preliminary matching pixel subset relative to said search area;

the frame comparator determining an actual matching pixel subset from the other video frame based on the location determined by the match position estimator; and a jitter estimator calculating a global jitter vector based on the pixel subset and the actual matching pixel subset thereby to estimate the jitter;

wherein said jitter estimator:

checks the reliability of the actual matching pixel subset; and only calculates the global jitter vector if the actual matching pixel subset is deemed to be reliable;

wherein reliability of the actual matching pixel subset is based on at least one of frame contrast measure and steepness measure; and wherein said frame comparator:

determines if the preliminary matching pixel subset is adjacent a border of the search area;

if not, designates the preliminary matching pixel subset as the actual matching pixel subset;

otherwise, alters the search area; and compares the pixel subset to candidate pixel subsets within the altered search area to determine the actual matching pixel subset;

wherein said altering comprises:

shifting the search area in the direction of the preliminary matching pixel subset.

23. The apparatus of claim 22, further comprising:

a jitter compensator transforming the video frames based on the estimated jitter.

24. The apparatus of claim 23, wherein said jitter estimator further calculates a rotational jitter vector.

25. A non-transitory computer readable medium embodying a computer program for estimating jitter between two video frames in a digital video sequence, the computer program, when executed, performs a method comprising:

comparing a pixel subset of one video frame to candidate pixel subsets within a search area in the other video frame to determine a preliminary matching pixel subset from the candidate pixel subsets;

determining an actual matching pixel subset from the other video frame based on the location of the preliminary matching pixel subset relative to said search area; and calculating a global jitter vector based on the pixel subset and the actual matching pixel subset thereby to estimate the jitter;

checking the reliability of the actual matching pixel subset; and only calculating the global jitter vector if the actual matching pixel subset is deemed to be reliable;

wherein reliability of the actual matching pixel subset is based on at least one of frame contrast measure and steepness measure; and wherein said determining comprises:

determining if the preliminary matching pixel subset is adjacent a border of the search area;

if not, designating the preliminary matching pixel subset as the actual matching pixel subset;

otherwise, altering the search area; and comparing the pixel subset to candidate pixel subsets within the altered search area to determine the actual matching pixel subset;

wherein said altering comprises:

shifting the search area in the direction of the preliminary matching pixel subset.

26. The non-transitory computer readable medium according to claim 25, further comprising:

transforming the video frames based on the estimated jitter.

* * * * *